United States Patent [19]

McMullin et al.

[11] Patent Number: 4,853,604
[45] Date of Patent: Aug. 1, 1989

[54] POSITION AND SPEED SENSORS

[75] Inventors: Francis McMullin, Ennis; John V. Byrne, Dalkey; Aengus Murray, Dublin, all of Ireland

[73] Assignee: Kollmorgen Technologies Corporation, Dallas, Tex.

[21] Appl. No.: 148,578

[22] Filed: Jan. 26, 1988

Related U.S. Application Data

[62] Division of Ser. No. 789,147, Oct. 18, 1985, Pat. No. 4,737,698.

[30] Foreign Application Priority Data

Oct. 19, 1984 [IE] Ireland .................................. 2701/84
Apr. 16, 1985 [IE] Ireland .................................... 960/85

[51] Int. Cl.⁴ ................................................ G05B 1/06
[52] U.S. Cl. ..................................... 318/653; 318/661; 336/75
[58] Field of Search ............... 318/660, 653, 661, 687; 336/75, 79, 77

[56] References Cited

U.S. PATENT DOCUMENTS

| 2,145,742 | 1/1939 | Wecsung | 336/77 X |
| 2,986,714 | 5/1961 | Smith | 336/30 |
| 3,699,558 | 0/1972 | Hendley et al. | 336/79 |
| 4,039,929 | 8/1977 | Weckenmann | 336/77 X |
| 4,080,592 | 3/1978 | Zabler | 336/79 X |
| 4,236,093 | 11/1980 | Birnbaum | 310/155 |
| 4,425,511 | 1/1984 | Brosh | 336/79 X |
| 4,507,638 | 3/1985 | Brosh | 336/79 |

FOREIGN PATENT DOCUMENTS 1122763 8/1968 United Kingdom .
1250759 10/1971 United Kingdom .
1499417 2/1978 United Kingdom .
2064125A 6/1981 United Kingdom .

OTHER PUBLICATIONS

The Screened Inductance Sensor; A New Position and Speed Measurement System, Proc. Motorcon, vol. 10, Apr. 1987, Hannover, pp. 220-237, Byrne, McMullin & Murray.

Linear Motion Screened Inductance Sensors, Proc. Conf. on Applied Control, Jun. 1987, Minneapolis, Minn., U.S.A., pp. 120-129; Byrne, McMullin & Murray.

Primary Examiner—Benjamin Dobeck
Attorney, Agent, or Firm—Morgan & Finnegan

[57] ABSTRACT

In a sensor having a drive winding for establishing a forward field, an electrically conductive screen is displaceable relative to a sense winding. In the presence of the drive field, eddy currents are generated in the screen to establish a counter-field opposing the forward field, so that the sense winding is shaded by the screen to a varying extent during relative displacement of screen and sense winding and the voltage induced in the sense winding is accordingly correspondingly varied. Application of a high frequency input to the drive winding results in a modulated output from the sense winding which may be demodulated to provide a signal indicative of screen position relative to sense winding. The position signal may be further processed to provide a speed signal. The sensor may assume a multiplicity of linear or planar, rotational and axial or solenoidal configurations.

8 Claims, 56 Drawing Sheets

SLOPE AT $x_1 = \dfrac{dv}{dx_1}$

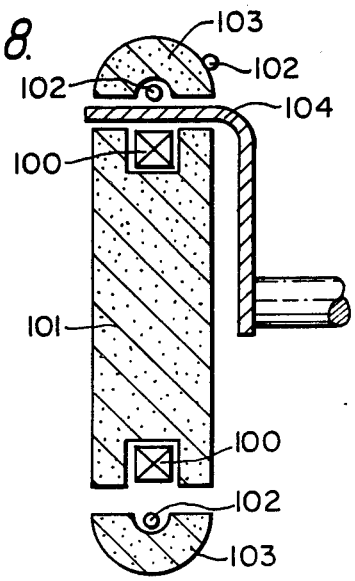
Fig.48.
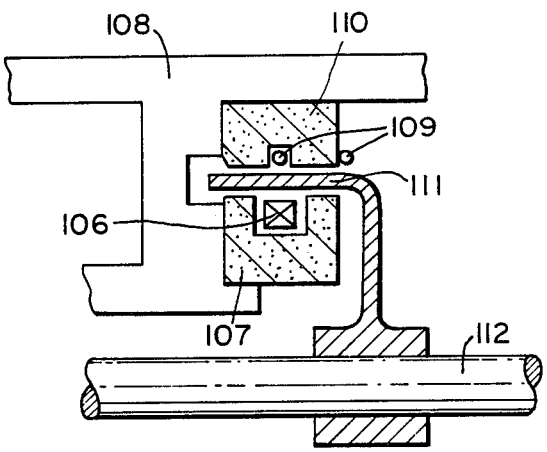
Fig.49.
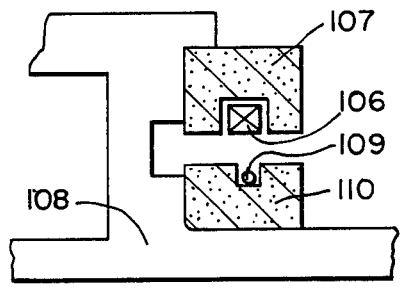

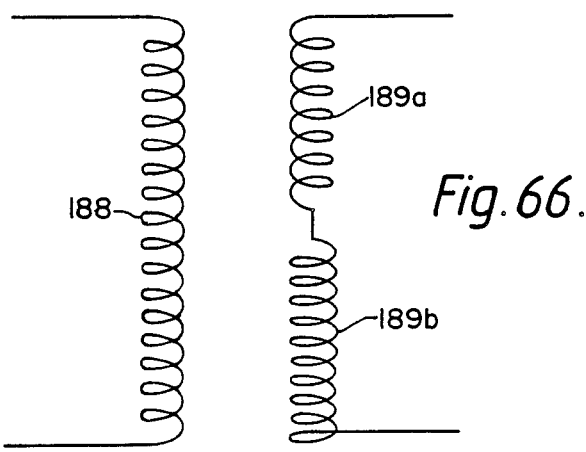
Fig. 66.
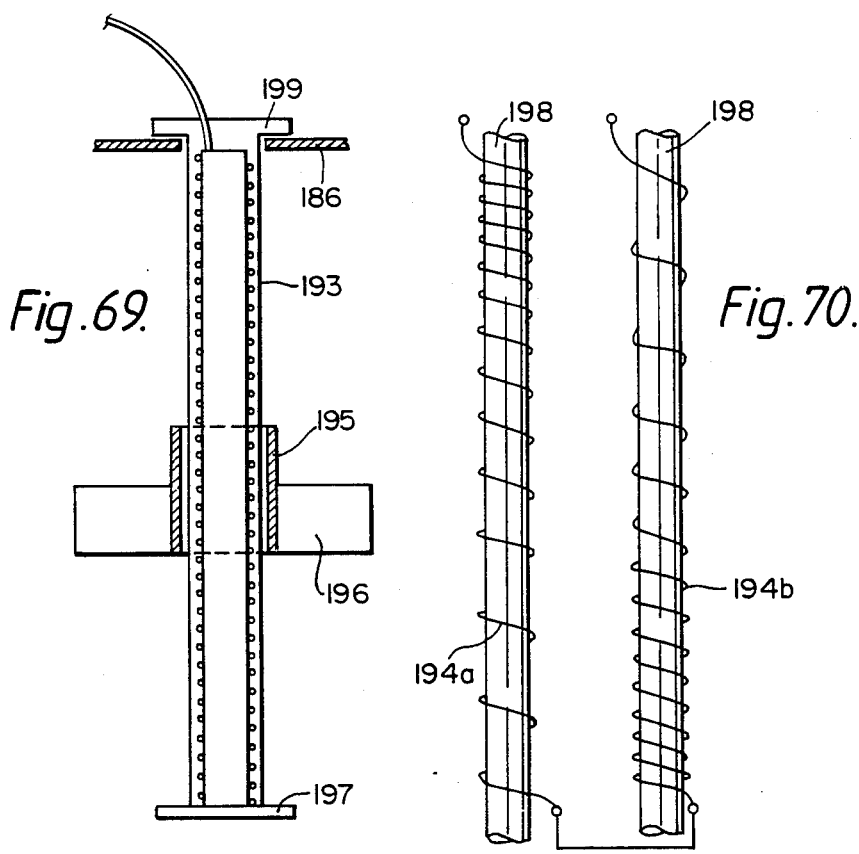
Fig. 69.
Fig. 70.

POSITION AND SPEED SENSORS

This is a divisional of co-pending application Ser. No. 789,147 filed Oct. 18, 1985, now U.S. Pat. No. 4,737,698.

BACKGROUND OF THE INVENTION

1. Field of the Invention

This invention relates to sensors, in particular position and speed sensors. Position sensors provide signals indicative of the position of a moving member with which they are associated relative to some fixed datum and, by appropriate processing of the position signals, further signals indicative of the speed of movement of the moving member relative to this datum may also be derived. Speed sensing systems serving this latter purpose form a further subject of the present invention.

The invention also relates to sensors for use with electrical machines, such as, inter alia, brushless d.c. drives and synchronous motors. Machines and drives of these kinds are used in machine tool positioning and robots, and in addition to these applications, angle sensing in general and motor commutation represent further favoured fields of use. Position and speed sensors according to the present invention and drive systems incorporating them are also suited to use with saturable variable reluctance machines and drive systems such as those forming the subjects of our co-pending Patent Applications entitled "Variable Speed Variable Reluctance Electrical Machines" and "Control Systems for Variable Reluctance Electrical Machines", respectively Ser. No. 789,038 now U.S. Pat. No. 4,670,696, issued June 2, 1987, Ser. No. 788,856, filed Oct. 18, 1985, now abandoned".

2. Description of the Prior Art

Known position and speed sensors include absolute and incremental digital encoders, resolvers based on the varying mutual inductances of windings moved relative to one another, variable-capacitance devices, Hall devices sensing permanent-magnet fields, and inductosyn type transducers.

For some applications, these solutions for position and speed sensing may be too costly, insufficiently robust, or unreliable in hostile environments, or they may have insufficient resolution. Some do not lend themselves to the derivation of an acceptable speed signal.

BRIEF SUMMARY OF THE INVENTION

It is an object of the present invention to generate analogue or digitally coded position signals in a simple robust device and to extract if desired, from these signals, a high-resolution bi-directional speed signal.

It is a further object of the invention to provide information on motor rotor position in a brushless electric drive in order to facilitate the programming of phase currents.

According to the invention, there is provided a sensor comprising a drive or exciting winding for establishing a forward or drive field, at least one secondary or sense winding in which a voltage may be induced in the presence of a said forward or drive field, and at least one conductive screen within which eddy currents are generated in the presence of a said forward or drive field to establish a counter-field opposing said forward field, said screen and secondary winding being displaceable relative to one another within said drive field so that said secondary winding may be shaded by said screen to a varying extent to thereby vary the voltage induced in said secondary winding.

Accordingly the net field in the region of the screen is shaded so that the mutual coupling between the drive and the secondary or sense winding is reduced. Thus the voltage induced in the secondary winding is varied and where an alternating voltage is applied to the drive winding, the output from the secondary is a modulated alternating voltage. The spatial distribution of the drive field is modulated as the screen moves through it, the result of this being a modulation of the output voltage of the secondary winding.

The sensor according to the invention may have a plurality of secondary or sense windings, each said winding being oriented relative to the other or others of said windings so each said winding provides a varying voltage output substantially indicative of screen position in a respective particular direction of screen displacement. In a particular construction, the sensor may have three secondary or sense windings disposed for the detection of three-dimensional screen displacement.

Said relative displacement of said screen and said secondary or sense winding may be limited to substantially a single direction of displacement. Said screen may have a surface region which is substantially parallel to a notional surface defined by said secondary or sense winding. Said surface region may be substantially planar and said secondary or sense winding may be a substantially flat winding defining a substantially parallel plane. Said screen and said secondary or sense winding may be relatively displaceable along a substantially linear path. Said screen and said secondary or sense winding may alternatively be relatively displaceable along a circular path.

In a favoured embodiment, said surface region may be a sector of a cylindrical surface and said secondary or sense winding may be disposed about the periphery of a notional cylinder substantially concentric with said cylindrical surface region sector, said screen and said secondary or sense winding being relatively displaceable in a circumferential direction about the substantially common axis of said cylindrical surface and said notional cylinder.

In an alternative construction, said surface region may be substantially cylindrical and said secondary or sense winding may be disposed about the periphery of a notional cylinder substantially concentric with said surface region, said screen and said secondary or sense winding being relatively displaceable in an axial direction relative to the substantially common axis of said cylindrical surface region and said notional cylinder.

The sensor of the invention may include a further secondary or sense winding, the progressive shading of which during said relative displacement of said screen and said first secondary or sense winding proceeds in a manner substantially identical with the progressive shading of said first secondary or sense winding during said relative displacement, and said further secondary or sense winding may be disposed relative to said first secondary or sense winding so that the Progressive shading of said further secondary or sense winding during said relative displacement is spaced apart in time from that of said first secondary or sense winding.

The or each said secondary or sense winding may have a phase loop or coil wound in one electrical sense and an anti-phase loop or coil wound in the opposite electrical sense, so that in the presence of said forward or drive field, the voltage induced in the anti-phase coil in the absence of said screen is substantially equal in magnitude but opposite in polarity to that induced in the phase coil. The or each said secondary or sense winding may have a multiplicity of coils or loops extending in said direction of relative displacement and each successive coil or loop in said direction may be wound in the opposite electrical sense to the or each adjacent coil or loop.

The secondary winding must have at least one turn, but in this preferred arrangement, it has a plurality of turns arranged to define one or more pairs of loops or coils, each of which itself has at least one turn, and successive loops or coils are arranged in phase/ antiphase so that the basic net output voltage from the or each pair is zero, in the absence of the screen.

In a sensor according to the invention in an especially favoured embodiment, therefore, spatial patterns are set up in an otherwise homogeneous high frequency magnetic field by moveable electrically conductive screens, whose position is given by the synchronously-demodulated output of a chain (or chains) of search coils having alternate winding senses. The velocity of the screens is obtained by differentiation of these position signals. Thus, these spatial patterns in a coherent high frequency magnetic field extending over a linear or angular zone of interest are impressed by the conductive screen, the position of which is detected by synchronous demodulation of the output of the chain of fixed sense coils of alternating winding sense.

Voltage variations in each said secondary or sense winding during said progressive shading may follow a cyclic patter and said further secondary or sense winding may be disposed relative to said first secondary or sense winding so that said voltage variations are in phase quadrature.

The turns of the or each secondary winding may be shaped so that the voltage induced in said secondary winding during said relative displacement of said screen and the secondary winding may vary in a substantially predetermined manner.

Each successive incremental region of the or each said secondary or sense winding shaded by incremental advance of said screen during relative displacement of said screen and said secondary or sense winding may be substantially the same at all points along the path of said relative displacement. Alternatively, each successive incremental region of the or each said secondary or sense winding shaded by incremental advance of said screen during relative displacement of said screen and said secondary or sense winding may vary in magnitude, so that, for example, said voltage may vary in a substantially sinusoidal manner during said relative displacement.

A plurality of screens may be associated with the or each said secondary or sense winding or windings for said relative displacement. Said screen or screens and said secondary or sense winding or windings may be in close juxtaposition during said relative displacement, spaced apart by an airgap, and the or each said screen may have respective screen portions disposed one to each side of said secondary or sense winding or windings. Alternatively, respective portions of said winding or windings may be disposed one to each side of said screen or screens.

The drive winding may be displaceable with said at least one screen, which may itself be defined by an area of a displaceable member of the sensor coated with a conductive material.

In a sensing system comprising a sensor according to any preceding claim, means may be provided for applying an alternating voltage to said drive winding, along with means for detecting voltage induced in said secondary or sense winding or windings, and means for demodulating the voltage output or outputs of said secondary or sense winding or windings to provide a signal indicative of the relative disposition of said screen or screens and said secondary or sense winding or windings. A said sensing system may also include means for transforming a voltage output of said secondary or sense winding or windings into a signal indicative of the speed of said relative displacement of said screen or screens and said secondary or sense winding or windings.

The basic sensor measures position, with velocity being derived as the rate of change of position. The possible applications of the sensor and sensing system of the invention are manifold, and a number of nonlimiting further examples of use follow.

Rotor position and speed may be measured to commutate and control brushless electric motors, to control the motion of robot arms, to control the motion of cutting parts in machine tools in which the Prime mover of the tool is a rotary machine, and to control the opening and closing of valves in process and chemical industries. In a linear embodiment, the sensor of the invention may, for example, be used to directly monitor the motion of a cutting tool and control the operation of the machine in response to the position or movement of the cutter, with the advantage of elimination from the measurement of any backlash in the gear trains.

Since the moving part of the sensor is passive and constructionally simple, being for example defined merely by an area of conductive material on a substrate, it may easily be incorporated into unusual shapes such as spheres, for application in the tracker balls used in the avionics and computer industries. It may also be included in parts such as cylinders for the control of linear motion and in countless other irregular shapes. Because of the low cost of the moving screens, they may in certain circumstances be regarded as disposable, and included in parts needing accurate positioning during assembly or manufacturing but not otherwise requiring to be moved again subsequently.

Said at least one screen may suitably be an area of a member displaceable along said path of movement, said area being coated with a conductive material, such as a layer of copper. Alternatively the screen and support may be an integral aluminium structure.

The invention may be put into effect in a multiplicity of embodiments. Conductive patches constituting the screen may be applied to virtually any moving element, even for example spherical objects such as tracker balls used in positioning devices. A conductive region or screen may itself be made up of a number of conductive sub-regions, for example an array of conductive squares. This facility of establishing the conductive screen in a diversity of ways makes the device extremely versatile and capable of incorporation in equipment and installations of all kinds and as has been explained, it may readily be adapted to cylindrical, linear, and disc geometries.

The sensor system of the invention may also be used to measure many different further parameters which are derived from and related to a position or velocity measurement. Such parameters include by way of non-limiting example, liquid levels in tanks, pressure, tension or compression and strain, measured by determining the elongation or other change in dimensions of a loaded member, and the flow rate of fluids in conjunction with a rotating vane or rotor in the fluid flow.

BRIEF DESCRIPTION OF THE DRAWINGS

Embodiments of the will now be described having regard to the accompanying drawings, in which:

FIGS. 42 to 49 show diagrammatic sectional views of cylindrical constructions of sensor according to the invention, FIG. 66 shows the winding arrangements used in the sensors of FIGS. 64 and 65, FIG. 69 shows a cylindrical device according to the invention for liquid level measurement, in which the sense windings are of variable pitch, FIG. 70 shows the sense winding arrangement in the device of FIG. 69.

DETAILED DESCRIPTION OF THE DRAWINGS

Figure 1:
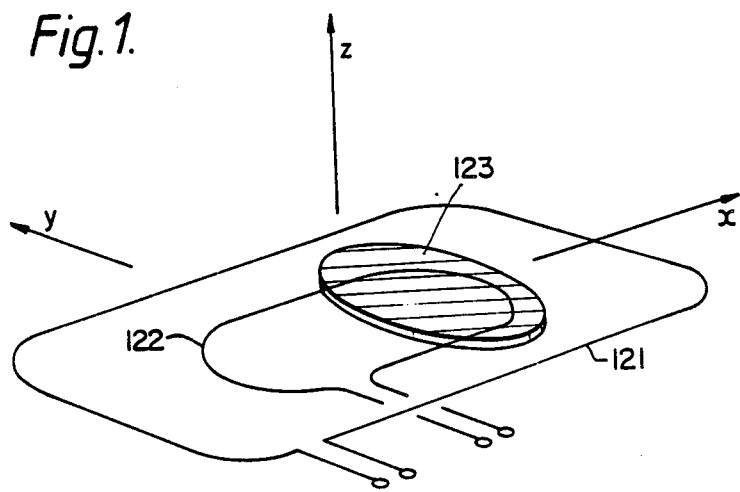
FIG. 1 shows in pictorial view a basic planar embodiment of sensor according to the invention.

FIG. 1 illustrates a basic planar configuration of transducer according to the invention. A unipolar magnetic field is established by passing a current through a drive winding 121 which is generally planar and has a single turn. This field is substantially perpendicular to the plane defined by the drive winding and is created by excitation of the drive winding by means of a high-frequency oscillator. Voltage is accordingly induced in a secondary or sense winding 122 of the transducer, which has a single coil having a single turn. The secondary winding may be substantially co-planar with the drive winding or it may be located in a plane parallel to it. A generally planar electrically conductive screen 123 is disposed within the region of the field and is displaceable relative to the secondary winding. In relative dispositions of the screen and secondary winding in which the screen overlies the secondary winding, the screen shades a portion of the winding so that the voltage induced therein is varied. This shading takes place by virtue of the generation of eddy currents within the electrically conductive material of the screen, these eddy currents establishing a counter field opposing the forward drive field.

The variation in the voltage induced in the secondary or sense winding 122 provides a signal indicative of screen position within the field. The signal is not however capable of being co-related with screen position unless some restraint is imposed on the degrees of freedom of screen movement. It will be apparent that in the absence of such constraint, the screen will be displaceable in any of the X, Y or Z directions, as indicated in FIG. 1. If constraint is applied against screen movement in the Y and Z directions, then the variation in secondary or sense winding output will provide an indication of screen position in the X direction.

Figure 2:
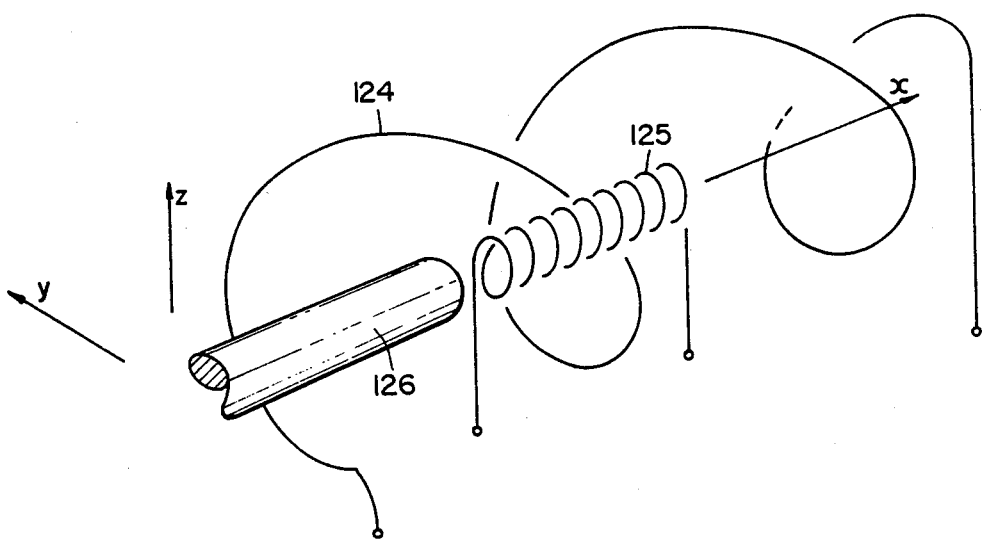
FIG. 2 shows in pictorial view a basic axial construction of sensor according to the invention, FIG. 3 show in plan view a basic sensor according to the invention, having a single loop sense winding.

The effect is not limited to planar constructions. FIG. 2 shows in schematic form an axial configuration of transducer according to the invention, having solenoidal drive 124 and sense 125 windings. An axial field is established by the solenoidal drive winding 124, which is substantially concentric with the sense winding 125. The screen 126 is an electrically conductive rod or other similar part axially insertable through the sense winding and constrained against movement in the Y and Z directions. The output signal is thus indicative of the axial or X position of the rod.

Figure 3:
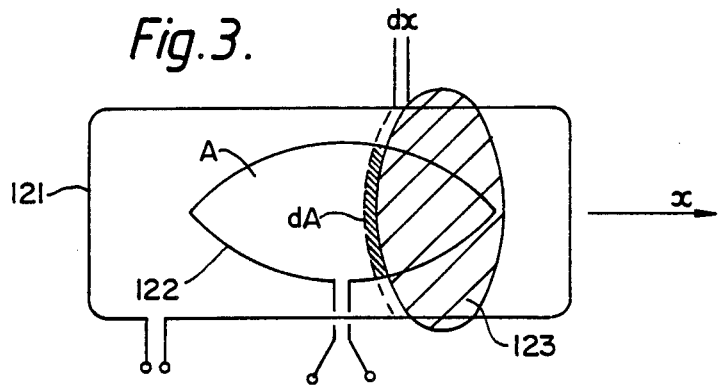

In the plan view of FIG. 3, which represents a device generally similar to that depicted pictorially in FIG. 1, an incremental displacement dx of the screen 123 is shown, which has resulted in an extra or additional increment dA of sense winding area becoming exposed, leading to a corresponding augmentation of sense winding voltage. Given that the drive winding sets up a substantially even or uniform field over the area of the sense winding, the voltage induced in the latter will be proportional to its exposed or unshaded area A (assuming the shading effect of the screen is 100% effective).

Thus V=k.A, where k is a constant indicative of the coupling between the sense winding and the drive field, and also indicative of the field strength.

Figure 4:
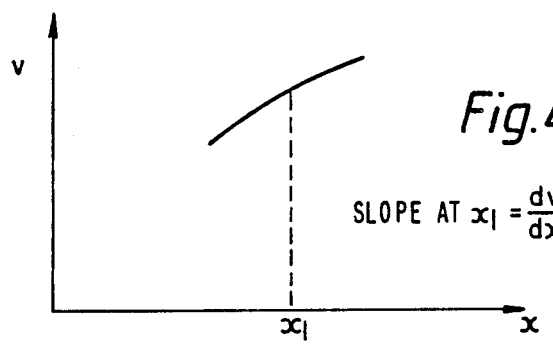
FIG. 4 shows the nature of the output signal from the device of FIG. 3.

As depicted in FIG. 4, a curve of voltage V against screen position X may be derived, to define the functioning of the device as a position transducer. At an arbitrary point X, the slope or shape of the voltage curve is then $$\frac{dv}{dx} = k \cdot \frac{dA}{dx}$$

Thus the shape of the curve is governed by the rate at which sense winding area is exposed by the screens, as relative screen/sense winding movement takes place. It will be apparent that this area will be a function of the shape of the screen or that of the sense coil, or of both their shapes. Thus any desired voltage output waveforms may be achieved by suitable geometric shaping of the screen or the sense winding, or both.

Figure 5:
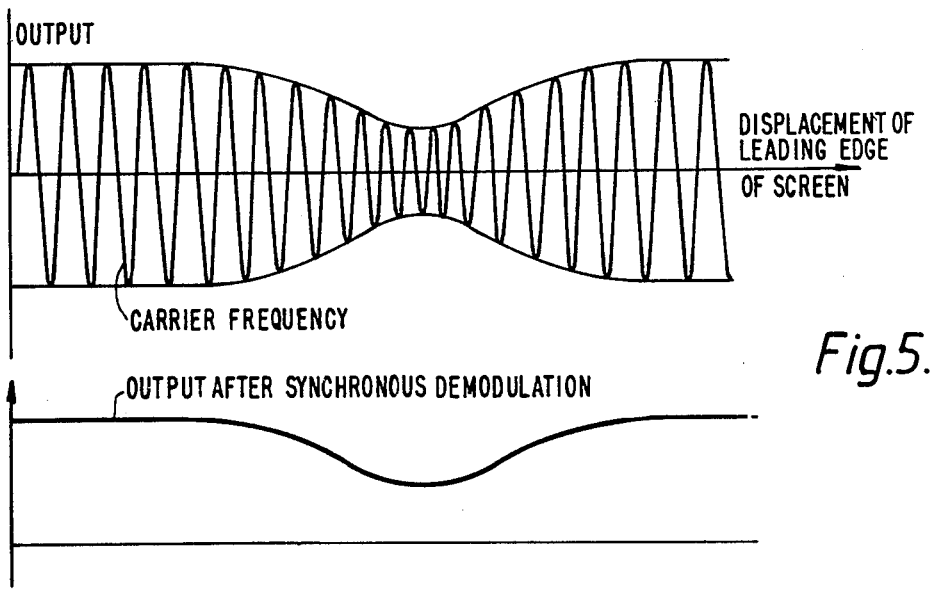
FIG. 5 shows in diagrammatic form, signal modulation for the arrangement of FIG. 3.

Thus if an alternating voltage at a carrier frequency is applied to the primary or drive winding 121, the drive field thus established is modulated by the presence of the screen 123. Hence the voltage induced in the secondary or sense winding 122 is also modulated, as shown in FIG. 5, to provide position information indicative of the relative dispositions of the sense winding and the screen. FIG. 5 indicates how the sense winding output is modulated according as an edge, in this instance the leading edge, of the screen advances across the sense winding in a direction parallel to the plane of the drive winding, and it will be seen that the output voltage is reduced to a minimum when the shading of the sense winding by the screen is at its maximum. Associated output signal processing means enables the information thus provided to be decoded and used, as will be subsequently described. The trailing edge of the screen could also serve as the position reference point.

It is not essential for the screens to be displaceable relative to the primary or drive winding as well as to the secondary (sense) winding. In particular in a linear device intended for limited screen travel, the drive winding may be supported on the screen or an element supporting the screen, and it may move with the screen. The feed to the drive winding is then provided by flexible leads. This arrangement does not affect the operation of the device and may represent a suitable construction in particular circumstances.

The term "shading" as used herein refers to the effect by which the output of the secondary winding is influenced by the presence of the screen. In the planar construction of FIG. 3, shading takes place by the screen overlying or overlapping the sense winding, but any relative disposition of screen and sense winding in which the output of the sense winding is modulated in accordance with FIG. 5 is also encompassed by this term. Thus the disposition of the screen relative to the windings of the device is not over-critical, and the screen may for example move along a path parallel to and closely spaced from the secondary winding, or alternatively it may be more remote from the secondary winding. Exemplary relative dispositions of screen and sense winding are subsequently described.

The sensor of the invention may also assume a multiplicity of rotational forms as well as translational constructions other than the planar arrangement described in relation to FIG. 3 and the axial arrangement of FIG. 2. Exemplary further embodiments are subsequently described. In the linear construction according to FIG. 3, the primary or drive winding may be mounted on a substantially flat or planar former, for example made of plastics. The sense winding may be mounted on the safe former or separately, and the members on which these windings are mounted may be stationary components of the sensor. The screen may be a portion of a sheet of conductive material or alternatively it may be a conductive surface region of a non-conductive substrate. Such a conductive surface region may be established by electro-chemical deposition. The screen may also consist of an assembly of smaller conductive sections or it may be formed from mesh material. In yet further variations, the screen may be a single shorted turn extending around the periphery of a notional screened area, or it may be an electrically conductive liquid, in, for example, the nuclear industry.

The windings may be defined by printed circuits, as subsequently described, and each coil or loop of the windings may have a plurality of turns, as also subsequently described. The shape of the screen and the shape of the sense winding as seen in plan or developed view together define the shape of the modulated sense winding output produced by the phenomenon employed by the sensor of the invention. The shapes shown in FIG. 3 have no particular significance and are intended only to indicate the general relationship between these components. The modulation shown in FIG. 5 is also representative of the general nature of this modulation and is not intended to be definitive. Subsequent embodiments disclose screen/sense winding relationships which enable certain especially desirable output waveforms to be achieved.

Thus in its most basic form, a device according to the invention incorporates means, such as a winding, for providing a drive field so that a magnetic flux may be established within a specified region. A sense winding of the device has at least one loop or coil located within the region of the drive field, so that a voltage may be induced therein in the presence of the field. The third element of the device is a conductive screen, the location of which within the field relative to the sense winding affects (or "shades") the sense winding so as to cause the voltage induced in that winding to vary. This variation in sense winding output enables information indicative of the relative dispositions of the screen and the sense winding to be derived.

Although best visualised in regard to FIG. 3 in terms of a generally planar structure, the device of the invention is not limited to such arrangements and, as will be described, numerous variations may be provided, including linear constructions, various rotating constructions of both cylindrical and disc types, arrangements using solenoidal coils, and in addition, the sensor of the invention may be adapted to detect position in two and three dimensions. All of these variations operate in accordance with the basic concept outlined above.

In particular, it may be noted that the drive winding configuration of FIG. 3 is not an essential feature of the invention and the nature and disposition of the drive winding may be other than as shown, provided only that its characteristics are such that the necessary homogeneous magnetic flux may be created in the appropriate region of the device, in which field inhomogeneities are created by the presence of the screen.

While the arrangement illustrated in FIG. 3 in which the sense winding consists of a single loop or coil is illustrative of the principle underlying the invention and may be adapted to provide a sensor, it will be apparent from FIG. 5 that the demodulated signal output from the sense winding has a d.c. bias and is not centered about zero. A signal of this nature may not be suited to the application of sensors in accordance with the invention to all practical circumstances.

Figure 6:
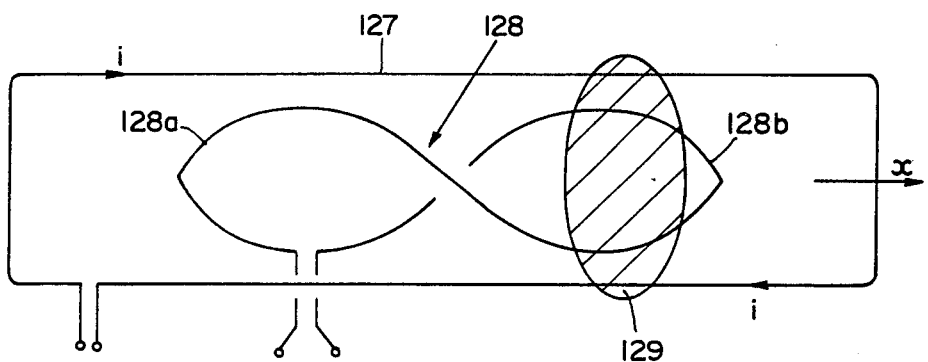
FIG. 6 shows a sensor according to the invention having a sense winding with two coils disposed in phase/anti-phase.

In the construction of sensor according to the invention shown in FIG. 6, the primary or drive winding 127 again consists of a single coil having a single turn, but in this instance the sense winding 128 has two loops or coils 128a and 128b oppositely wound so that they are arranged in phase/anti-phase. The screen 129 is similar to that of the arrangement of FIG. 3. The device of FIG. 6 may most appropriately be visualised as planar in construction, but as in the case of FIG. 3, the inventive concept described in relation to the present Figure is not limited to planar constructions.

In the absence of the screen, the voltages induced in the loops of alternating sense of the secondary winding are opposed or in antiphase, and accordingly there is no net output from the sense winding. The screening or shading achieved in the presence of the screen alters this balance and a net output from the sense winding results, the magnitude of which is dependent on the relative disposition of the screen and sense winding. Interposition of the screen in the field brings about eddy current generation in the screen, these eddy currents generating backing currents generating an opposing back field, so that the forward field of the drive winding is screened and forward flux transfer into the secondary or sense winding is blocked. The voltage output from the sense winding is a maximum when the screen overlies one or other of the coils of the sense winding to the greatest possible extent. The output from the winding is zero when each coil is shaded to an equal extent, the effect of the screen in this relative disposition being as if it were not present at all.

Figure 7:
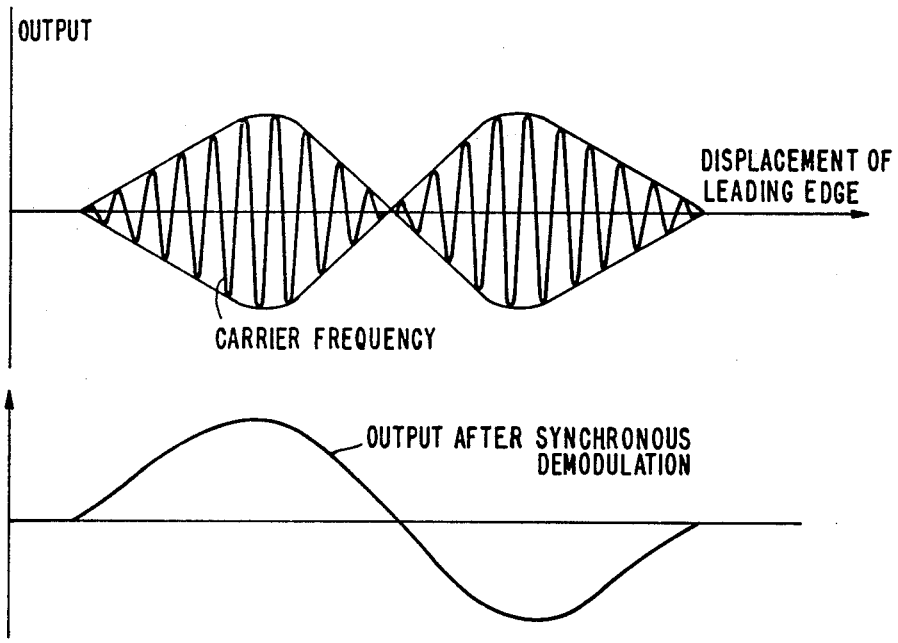
FIG. 7 shows sense signal modulation in the arrangement of FIG. 6.

In similar manner to the output illustrated in FIG. 5, the output of the secondary or sense winding in the present case is again a modulated A.C. voltage. The diagram of FIG. 7 illustrates the variation in sense winding output with displacement of the screen in the longitudinal direction of the drive and sense windings as shown in FIG. 6. It will be seen that the magnitude of the output rises gradually according as the screen initially overlaps the phase loop or coil 128a of the sense winding, to reach a maximum when the shading of this coil is also at its maximum, and then drops to a zero output when both phase 128a and anti-phase 128b coils are shaded to an equal degree. Output then rises again according as the anti-phase coil 128b is shaded, to finally fall away again as the screen moves completely away from its shading disposition with respect to the anti-phase coil. The demodulated output signal undergoes a reversal of direction at the transition from shading of the phase coil 128a to shading of the anti-phase coil 128b due to a reversal of the phase of the carrier frequency at that point.

Figure 8:
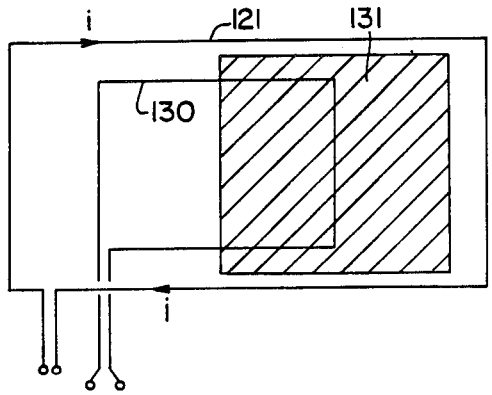
FIG. 8 shows a sensor according to the invention similar to that of FIG. 3, but having a rectangularly shaped sense winding.
Figure 9:
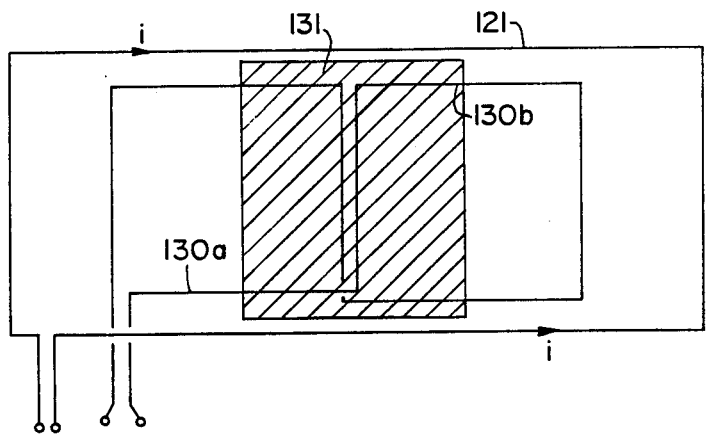
FIG. 9 shows a sensor similar to that of FIG. 8 but having rectangular sense coils in phase/anti-phase.

FIG. 8 is generally equivalent to FIG. 3, but has a sense winding 130 having a single substantially rectangular coil, while the screen 131 is also rectangular. It thus represents a more specific construction of the general conceptual arrangement of FIG. 3. FIG. 9 shows a similarly rectangular phase/anti-phase sense coil 130a, 130b arrangement, again with a rectangular screen 131.

The configurations of FIGS. 8 and 9 represent in a general manner one of three arrangements or dispositions of screen and sense winding or coils which have been found to be of special significance. Many practical embodiments of transducer according to the invention are derived from one or other of these. With rectangular sense coils in phase-antiphase and a rectangular screen having a span in the direction of screen/sense winding relative displacement approximately equal to the phase coil span, similarly measured, linear ramp modulation is achieved, which facilitates signal manipulation in many instances.

Figure 10:
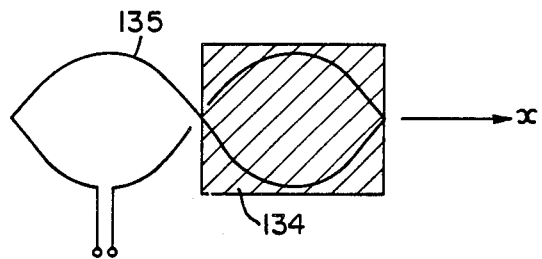
FIG. 10 is a schematic representation of a "sinusoidal" sense winding.
Figure 11:
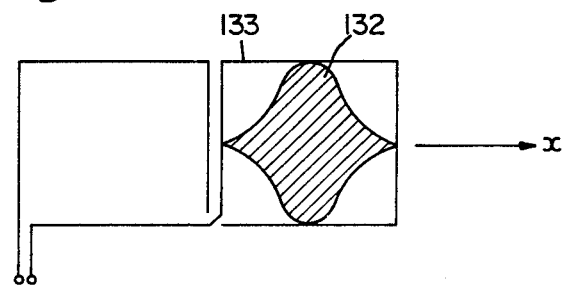
FIG. 11 is a schematic representation of a "sinusoidal" screen.

Other waveforms may be obtained by shaping either the screens or the sense coils or both. As shown in FIG. 11, a sinusoidal output waveform may be obtained by using a screen 132 having a sinusoidal profile displaceable relative to the sense winding 133 in the X direction. FIG. 10 shows an alternative arrangement producing substantially the same output, in which the screen 134 is rectangular but the sense windings 135 are profiled so as to give the desired sinusoidal output. Printed sense coils may be used having roughly sinusoidal shapes, refineable by computerised measurement and layout techniques so that the content of particular harmonics may be reduced. In either case the transducer demodulated output is a sinusoidal function of displacement. The drive windings have been omitted from these schematic diagrams but would in practice be present.

Figure 12:
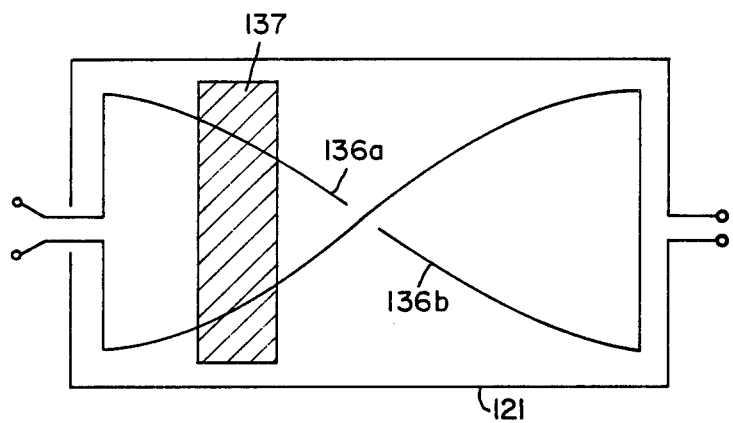
FIG. 12 shows a sensor arrangement having a shortened screen.
Figure 13:
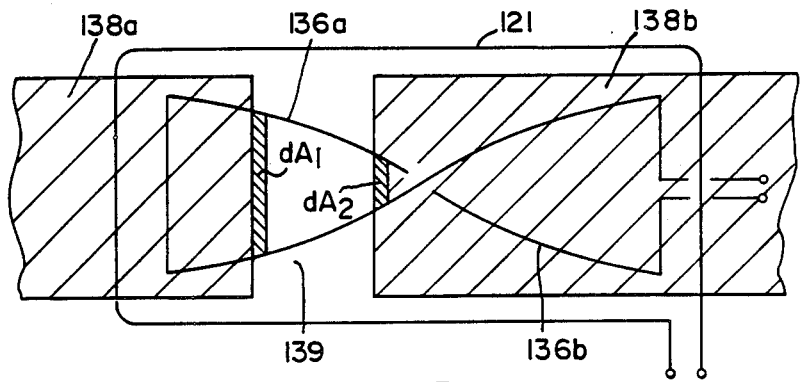
FIG. 13 shows an arrangement having a large screen with a "window" to define an unshaded area of the sense winding.

FIGS. 12 and 13 show arrangements having tapered sense coils 136a, 136b, narrowing in from their ends towards the central cross-over point. In FIG. 12, the screen 137 is of reduced span, thus providing a useful configuration in situations where it is desired to have a working stroke for the screen which is greater than the phase coil span. Such a requirement frequently arises in linear and pivoting constructions. The arrangement may however result in offset errors, due to the large unscreened areas.

In the similar but inverted construction of FIG. 13, a two-part screen 138a,b is used, a flux window 139 being defined between the screen portions. This arrangement is useful in a rotary geometry and also involves less offset error than the screening of FIG. 12. Screen displacement changes the screened area by the difference between the areas $dA_1$ and $dA_2$ indicated in the Figure. Any desired functional relationship between displacement and search-coil voltage may be established by appropriately profiling the sense winding.

Figure 14:
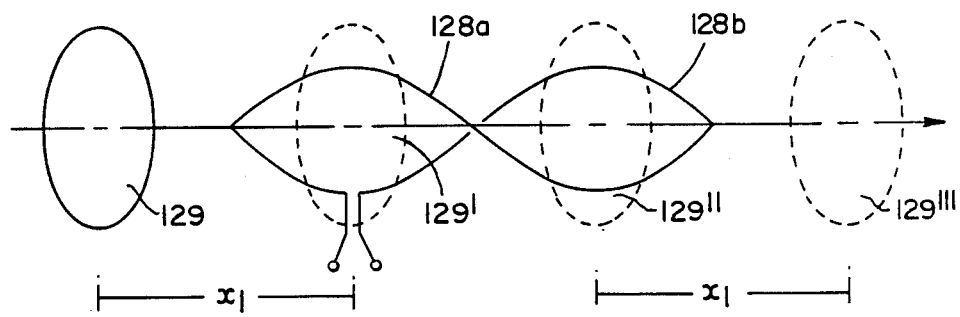
FIG. 14 is a diagrammatic representation of end effects in the arrangement of FIG. 6.

Movement of the screen 129 in FIG. 6 from a disposition in which it is centered on the phase coil 128a of the sense winding to a position in which it is centered on the anti-phase coil 128b of the sense winding results in the change of voltage following a particular slope or pattern, such as that shown in exemplary manner only in FIG. 7, in which the drive winding is also omitted. The demodulated signal during this transit moves between a positive maximum and a negative maximum or vice versa. FIG. 14 shows successive positions 129', 129" and 129''' of the screen 129 during its transit across the sense winding. It will be apparent that a similar span of movement $X_1$ of the screen from a position 129' or 129" centered on either the phase or antiphase coil to a position 129 or 129''' in which it does not shade either of the coils, or vice versa, will result in the sense winding output following a different pattern from that for the transit from position 129', centred on the phase coil, to position 129", centred on the anti-phase coil, due to end effects. This is because transit between the coils increases shading of one coil and decreases that of the other coil, whereas movement to or from the end positions 129 and 129" acts to vary the shading of one coil only. If these end effects are to be eliminated, an extra screen is required to each side of the single screen shown in FIG. 6, so that each equal increment of screen movement will result in a similar modulation of the sense winding signal. Thus with a three screen arrangement the output of the device as determined by the position of the central screen will follow the same pattern for each increment of movement of that screen, whether between a position remote from either coil of the sense winding and a position of maximum screening of one or other of the two coils, or between the two positions of maximum screening.

Figure 15:
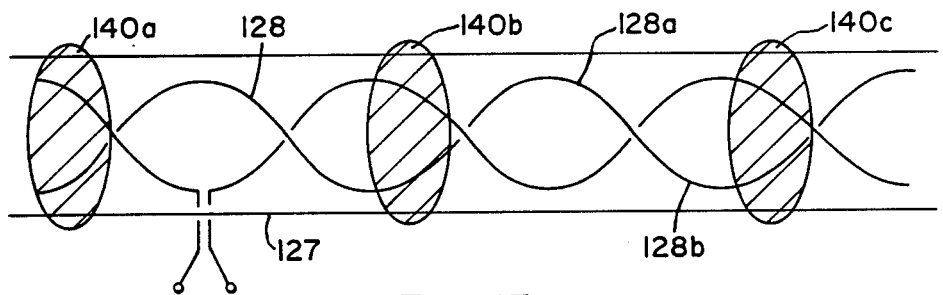
FIG. 15 shows a portion of a sensor according to the invention of infinite length.

Thus in an infinitely long sensor in accordance with the invention, as illustrated in FIG. 15 for a construction similar to that of FIG. 6, a series of screens 140a, b, c are provided, so that the corresponding coil of each successive pair of phase/anti-phase coils 128a, b is simultaneously shaded by each respective screen. Isolation of a phase/anti-phase segment of this infinite device results in an arrangement substantially corresponding to that of FIG. 6. While such an infinite device is a purely theoretical concept in terms of a linear sensor, it will be immediately apparent that such a construction is readily feasible in rotational embodiments of the invention.

As previously noted, the relative shapes of the screen and sense windings illustrated in the foregoing FIGS. are in no way definitive, while the outputs shown in FIGS. 5 and 7 are also exemplary only. The shape of the demodulated output voltage from the sense winding as a function of screen disposition relative to the winding is inter alia determined by the respective relative geometries of the screen or sense winding, or both. Further examples of geometrical variations are subsequently illustrated. However considering briefly one aspect of this relative geometry, it will be apparent that if the dimension of the screen in the direction of relative displacement of screen and coil shown in for example FIG. 6 is shorter than the length of the coil in the same direction, then there will be a portion of their relative displacement during which the area of the coil shaded by the screen will be substantially constant. Thus for a section of their relative displacement, there may be no variation in sense winding output. This situation may be compensated for by appropriate shaping of the screen or the sense winding or both, so that for each relative disposition of screen and winding, there is a unique shaded area and hence a unique signal output, at least during the section of movement between maximum shading of the phase coil and maximum shading of the anti-phase coil in the phase/antiphase arrangement.

The size of the screen in many planar or disc-type constructions of the invention is preferably substantially the same as the area of each coil of the sense winding, or in a specially favoured variation, it is slightly larger than the area of the coil. A similar relationship may apply to cylindrical constructions, so that the surface area of the screen overlying or shading the coil is slightly larger than the corresponding surface area of the coil. However this particular area relationship is not essential and for certain uses, in particular in linear constructions, the screen may be of lesser dimensions than the area of the coil.

The screen or screens of the invention may be accommodated on a movable support of the device and attached to the moving part by means of a non-conductive support member. Alternatively the screens may be etched from a metallically coated non-conductive material, in the manner of a PCB, or formed by punching out rectangular notches from a long rectangular metal strip. The screen should preferably be non-ferro-magnetic.

The screens may be formed of metal sections, each of which may define a sectoral portion of a cylinder and may be attached to the inside or outside (in the cases of outside or inside rotor geometries respectively) surface of a plastics cylindrical rotor body. Alternatively, the screens may be a one-piece pressing, moulding or casting, or they may be defined in a preferred construction by metallised areas or regions of a plastics moulding, established by metal deposition on the plastics material. The use of injection-moulded plastics rotors or other moving members with laid-on screens offers a particularly advantageous and economical embodiment of the invention.

A possible material for the screen is aluminium, which is readily castable and light. A plastics structure with a copper-plated screen portion represents an alternative and particularly satisfactory arrangement. A very thin layer of copper may be provided, about 0.1 mm being adequate at 100 KHz. If lower frequency signals are applied to the primary winding, than a thicker screen may be required.

In the continuous embodiment of FIG. 15, the drive winding 127 may be a single winding with respective portions extending along opposite sides of the direction or path of movement of the screens and bridged at either longitudinal end of the device, or alternatively separate respective individual drive winding portions may be provided on each side of the screen path. Displacement of the spaced screens 140a, 140b, 140c of the device by one sense winding coil pitch from a position shading one coil of each sense winding phase/anti-phase coil pair will shade the other of the coils of each pair and cause a phase reversal of 180° relative to the drive frequency in the high frequency output voltage from the sense winding. When the screens overlie the coils of each sense winding coil pair to an equal extent, as in the case of the single pair of FIG. 6, the output voltage from the winding will be a minimum and ideally zero. Thus the output voltage moves between being either substantially in phase or substantially 180° out of phase with the drive winding voltage. Synchronous demodulation of the high frequency output voltage will yield a bidirectional position signal, with one electrical cycle corresponding to movement over one winding pitch, i.e. two coils.

Figure 16:
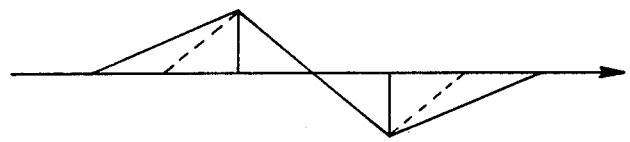
FIG. 16 shows the idealised demodulated sense winding output of the arrangement of FIG. 9.

FIG. 16 shows in solid line the demodulated idealised voltage output of the sense winding 130 of FIG. 9 for a transition of the screen 131 across the coils 130a, 130b of the sense winding in the elongate direction of the sense winding. It will be seen that this demodulated output rises to a maximum for maximum overlap of the screen and the Phase coil and then reduces again, passing through zero when the screen overlaps both phase and anti-phase coils to an equal extent. The output then rises to a negative maximum, before falling away again to zero as the screen moves away from the anti-phase coil. The solid line in the initial and terminal portions of the output represents the waveform which is produced by a single screen, with the end effects already mentioned in regard to an earlier Figure. The dotted line shows how this waveform may be modified by the provision of an additional screen to each side of that central screen, each additional screen being spaced from that shown in FIG. 9 by twice the coil pitch. For absolute position information, one winding pitch should correspond to the maximum desired travel of the screen, with provision for end effects, as described above.

Figure 17:
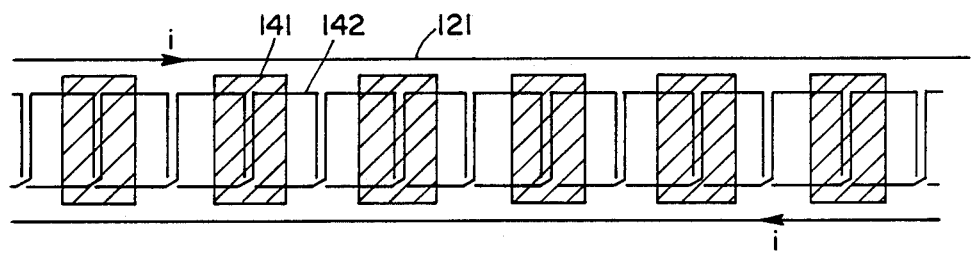
FIG. 17 shows a portion of a sensor according to the invention having generally rectangular sense coils in an arrangement of infinite length.

FIG. 17 represents a portion of a rectangular coil construction of infinite length, corresponding to the generalised arrangement of FIG. 15. Each screen 141 has a length in the direction of screen displacement relative to the sense winding 142 approximately equal to the pitch of the output or secondary winding coils. The screens are spaced apart between their centres by twice the centre distance of the output coils so that the gaps between them also approximate to the pitch of the output winding coils. Accordingly the gaps between the screens are substantially the same extent in the direction of screen displacement as the breadth or extent of the screens themselves in this same direction.

In the arrangement of FIG. 17, with the use of concentrated, full-pitch sense windings and of full-pitch screens, the cross-sectional areas of unscreened magnetic flux (strong field) located between the screens and of screened flux (weak field) underlying the screens, linking with a sense winding, vary in a piece-wise linear manner with the displacement of the screens. For steady motion, the demodulated sense voltage will approach a triangular waveform.

Triangular output waveshapes allow derivation of a speed signal by analog differentiation or by differencing, and facilitate derivation of digital position signals.

Figure 18:
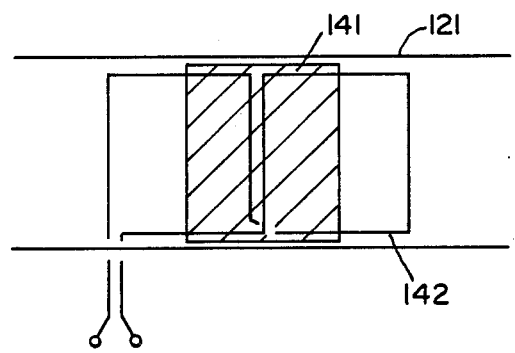
FIG. 18 shows a single coil pair of the arrangement of FIG. 17.

FIG. 18 shows a phase/anti-phase coil pair of the sense winding of FIG. 17, extracted and isolated from the infinite arrangement of FIG. 17. Each sense winding coil pair will be seen to substantially equate to the simple phase/anti-phase arrangement of FIG. 9.

The number of secondary or sense windings is not limited to one and several such windings may be used to provide more exact position information. It will be apparent from FIG. 16 that a single sense winding having phase/anti-phase coil pairs will not provide absolute position information over a complete electrical cycle. For each voltage value, there are two possible positions of the screen relative to the sense winding, whether the solid line showing output voltage as affected by end effects is followed or the dotted line, where end effects are compensated for. The additional information required to uniquely identify each position of the screen may be provided by the use of a second sense winding, and the outputs of the two secondary or sense windings may be in phase quadrature.

Figure 19:
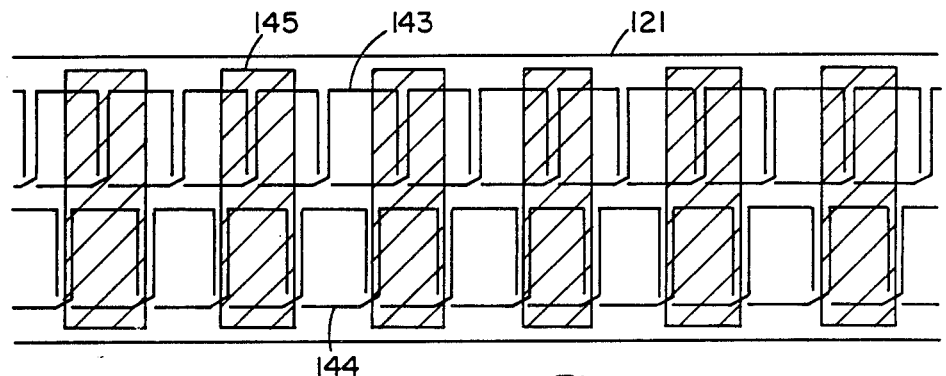
FIG. 19 shows an arrangement similar to that of FIG. 17 but having two sense coils in phase quadrature.

An arrangement of this kind is illustrated in FIG. 19, where the adjacent boundaries or edges of each successive coil of one sense winding 143 are substantially aligned with the mid-points of the coils of the other sense winding 144. Thus when a screen 145 fully shades a coil of one sense winding it overlies phase and anti-phase coils of the other sense winding to an equal extent. Thus a maximum output from one sense winding is accompanied by a zero output from the other sense winding. In a practical construction, the two windings may lie for example in substantially the same plane, rather than being disposed side by side in the direction of screen displacement, as shown in FIG. 19.

Two such sense windings represents the minimum necessary to provide absolute position information over one full electrical cycle but more sense windings may be included in a sensor according to the invention if required. In this way displaced sets of position information may be provided. It may also be noted that arrangements having two or more sense windings are not necessarily confined to constructions in which the winding coils follow a phase/anti-phase sequence, and a succession of single coil sense windings may be used, as in the basic arrangements of FIGS. 3 and 8.

Figure 20:
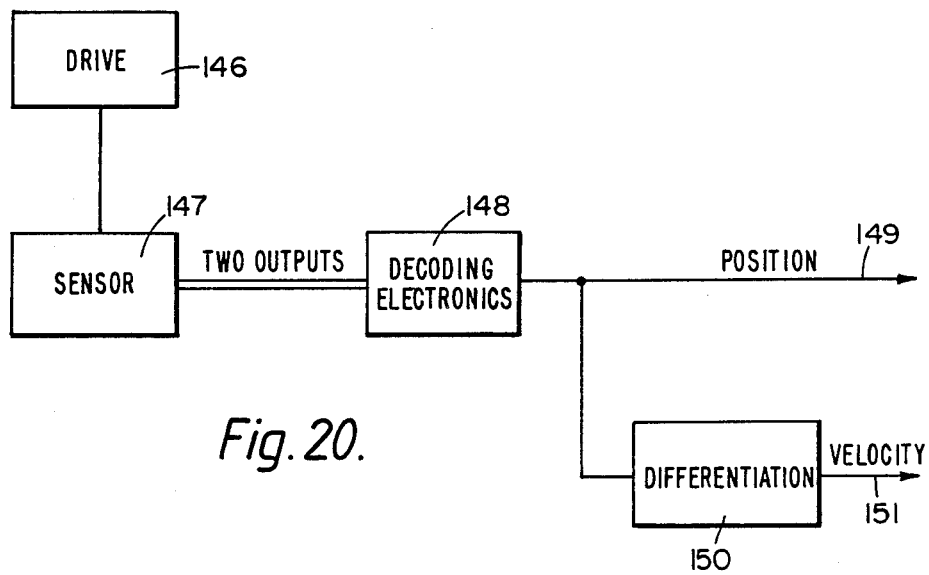
FIG. 20 shows a basic decoding circuit for a sensor according to the invention.

FIG. 20 is an outline schematic diagram of a basic signal-decoding circuit for the sensor of the invention. Drive 146 causes relative displacement of the screen and the sense windings of the sensor 147, to be used for absolute position information. Most usually, the sense windings will be stationary vis a vis the body of the sensor and the screen will be moved, but an inverse arrangement is possible, as indeed is an arrangement in which both screen and sense windings are each individually displaceable. The field established within the sensor by the drive winding is shaded by the conductive screens in a pattern which varies with position according as this relative displacement of screen and secondary windings take place, to provide an output voltage signal. Demodulation of the output voltage signal yields a signal indicative of the position of the screen relative to the secondary windings at every position along their path of relative movement. The dual output, one from each sense winding, from the sensor is fed to decoding electronics 14B, from which a position signal 149 is basically derived. This position signal may be differentiated at 150, to provide a velocity output 151 of the system. The sensor according to the invention essentially produces an analog output, which may be adapted as required into digital form. More comprehensive details of decoding and signal processing features of systems incorporating the invention are subsequently set out.

Figure 21:
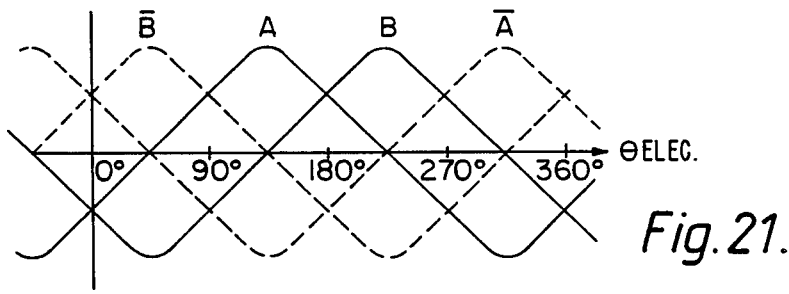
FIG. 21 shows the waveforms of demodulated sense voltages produced by sensors in accordance with the invention.

Direct analog processing may employ demodulated waveforms such as those in FIG. 21, to provide references in a control system directly. Appropriate design of the transducer may yield waveforms of special shape, as will be subsequently described, or alternatively the waveforms may be shaped with analog circuits.

Output A represents the waveform from a first secondary or sense winding and waveform B represents that from a spatially displaced second sense winding. The spatial displacement of these windings is arranged to be such that these waveforms are in phase quadrature, i.e. there is a 90° electrical displacement between them. These substantially triangle-wave outputs may also provide additional signals A bar, B bar, obtained by inverting the original waves A and B, as further explained hereinafter.

In general however, greater flexibility may be achievable by conversion of the signal to digital form and its processing in digital form. Analog to digital conversion may be achieved by either of two known methods, namely by "successive approximation" or by "tracking type converters".

Successive approximation converters demodulate the sense voltages and the demodulated outputs are multiplexed to give the linear portions of the waveforms. The outputs are then converted to digital form and further linearised as necessary. In this case therefore a transducer according to the invention is most appropriately adapted to provide output waveforms approaching triangles, having well defined linear sections.

For use with a tracking type converter, a transducer according to the invention is arranged to have sine/cosine modulation of the sense voltages in dependence on screen position and a position signal is then derived in a ratiometric manner in the converter.

An advantage of operating with sense voltages having triangular modulation is that they facilitate derivation of a velocity signal. If the sense voltages have good linear sections, they may be readily differentiated to obtain rate of change of position (i.e. velocity) and multiplexed to give a continuous output. The sensor of the invention may provide suitable waveforms in a relatively convenient manner.

It is thus apparent that transducers in accordance with the invention are adaptable for employment in a variety of systems and uses, and in a multiplicity of varying circumstances.

The sensor of the invention may use the linear ramp voltage waveforms already described but a particular advantage of the sinusoidal output voltage signals yielded by the constructions of windings hereinabove described is that sinusoidal modulation of the waveforms allows the sensor or transducer of the invention to be used with a large number of commercially available resolver to digital converters currently on the market.

Alternatively, the sense windings may have more complex shapes, while still retaining the feature of successive coils being in alternating senses, so as to complement the flux distribution caused by the screens and achieve a more sharply defined triangular wave output.

In the linear geometry, the device may be used to sense the position of moving parts in a mechanism or a machine, for example the motion of the type head of a printer or the cutting head on the bed of a machine tool.

Figure 22A:
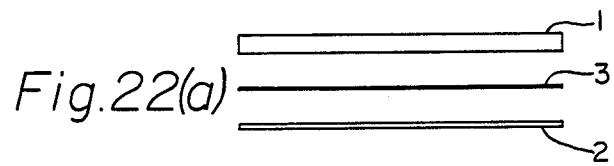
FIG. 22(a), 22(b) and 22(c) show in end view, a variety of possible relative dispositions of the components of a linear device according to the invention.
Figure 22B:
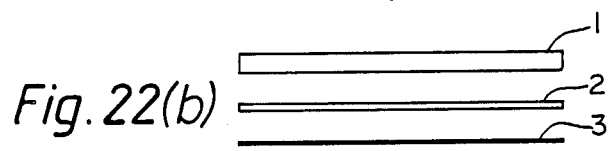
Figure 22C:
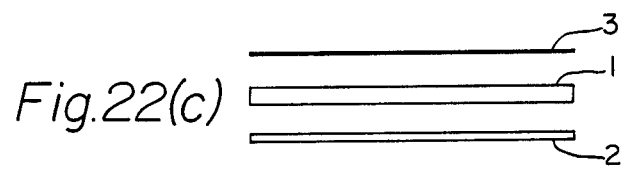

The disposition of the screens relative to the windings is not especially critical and the screens and windings may occupy a variety of relative dispositions. FIG. 22 shows sore of the possible options. In FIG. 22(a), the screen 3 is displaceably located between the primary or drive winding 1 and the secondary or sense winding 2. As shown in FIG. 22(b), the screen 3 is disposed on the opposite side of the secondary winding 2 from the drive winding 1. In FIG. 22(c), the screen 3 is located on the opposite side of the drive winding 1 from the secondary winding 2. Accordingly, in this latter case, the screen is not immediately adjacent to the secondary winding. It has been found that it is not in general always essential for the screen to be in very close juxtaposition to the secondary or sense winding or windings and that the device will perform satisfactorily provided that the screen is in a position relative to the drive and secondary windings which will allow it to fulfill its intended function of shading the coils of the secondary winding. However in more demanding applications, two techniques may be used to further reduce any dependence of output on airgap width.

Figure 23:
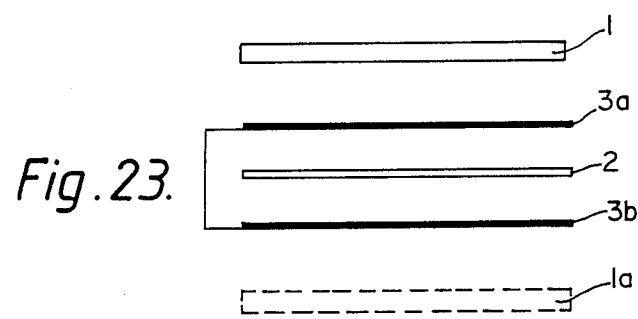
FIG. 23 shows a dual screening configuration for a sensor according to the invention.

FIG. 23 shows a dual screening configuration in which a screen portion 3a, 3b is located to each side of the sense winding 2 between the sense winding and the drive winding 1 or windings 1, 1a. Reference 1a indicates a second drive winding or drive winding portion in a symmetrical construction. This arrangement provides a measure of compensation against screen displacement in a direction transverse to its direction of displacement relative to the sense winding(s). In both cylindrical and disk form devices according to the invention, as will be subsequently described, double or box screens are particularly favoured.

Figure 24:
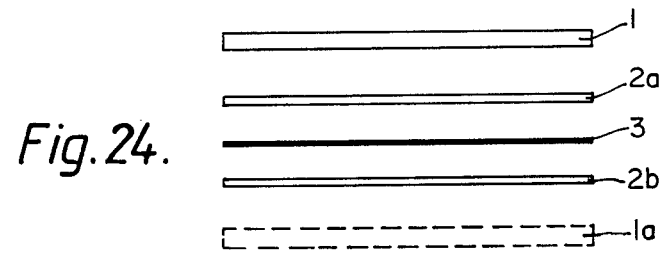
FIG. 24 shows a dual sense winding arrangement for a sensor according to the invention.

FIG. 24 shows another alternative for compensating for airgap variation. In this case two sense windings or sense winding portions 2a, 2b are used, located one each side of the screen 3 and series connected, so that an average field is seen at the output. Accordingly this arrangement is also insensitive to transverse motion of the screen towards and away from the sense windings.

A configuration in which the winding consists of a series of coils in phase/anti-phase may be readily realised in many constructions, despite the number of crossovers involved. For example the winding may be laid out on both sides of a printed circuit board with the crossovers arranged by external linking through the board. However if it is desired to lay out a winding of this nature in a single plane, such as may for example be required in applying the winding to a ceramic surface, this configuration may not be so convenient to realise by printed/etching processes. Also if it is desired to increase the signal output, so that multi-turn windings are required, the number of crossovers will be proportionally increased.

As already mentioned in connection with a number of the possible arrangements described above, the secondary windings may be provided in printed form on flexible substrates, these substrates being slotted into or mounted on formers in the correct position.

Figure 25:
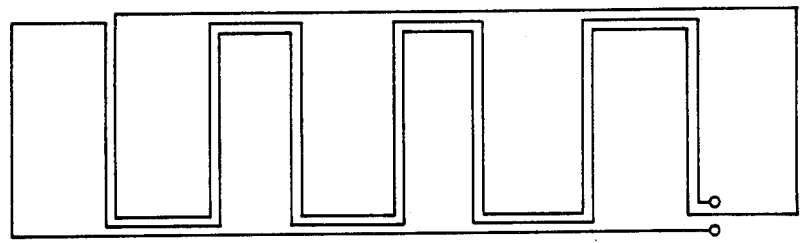
FIG. 25 shows a single-turn sense winding having no crossovers.

A single-turn winding configuration eliminating crossovers is shown in FIG. 25. In terms of flux linkages, this winding is equivalent to the winding with many crossovers shown in FIG. 17.

The sense windings may have single-turn coils to give economy of winding and a low-impedance output, rejecting capacitive pickup. Transformation to a higher voltage for demodulation may be effected by step-up transformers or amplifiers. Alternatively the sense windings may have more than one turn so that several conductors occupy each slot of for example, a cylindrical sensor, or each coil may consist of a distributed winding, to achieve special output characteristics and to take account of dimensional tolerances.

Alternatively, by use of spatially distributed sense windings, and/or shaped windings, and/or shaped screens, and/or greater distance between windings and screen, a sinusoidal variation with angle may be achieved. Thus sine and cosine outputs may be provided directly. The turns of a multi-turn winding may also be physically displaced to provide a distributed winding, so that special output characteristics may be achieved in this manner also. For example if a pair of coils, each of which basically yields a triangular wave, are displaced and connected in series, a trapezoidal wave form may be achieved.

The rectangular or planiform sense winding coil arrangements previously described are constructionally simple and thus advantageous in many conditions, but other shapes of coil and/or screen may be used to increase the sensitivity of the device to dimensional changes as well as giving the possibility of directly producing sinusoidal outputs. Such shaping may be of the form illustrated in FIGS. 10 and 11, while skewed screens may also be used. By means of a distributed winding the sensitivity of the device to mechanical imperfections may also be reduced.

Figure 26:
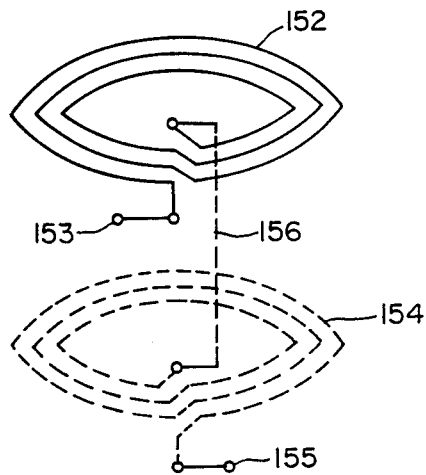
FIG. 26 shows a double-sided arrangement of secondary winding for achieving sinusoidal modulation of the output voltage waveform.

Linear embodiments of a "sinusoidal" arrangement of sense winding may be provided, with the windings having the form of an array of elongate concentric curvilinear turns defining the coils or loops, the axis of each of which is aligned with said direction of relative displacement of the screen and secondary winding. An example of such an elongate curvilinear winding in a multi-turn configuration is shown in FIG. 26. This is an example of a sense winding intended for sinusoidal modulation, implemented by printed circuit board techniques. The winding has an upper track 152 with a plurality of turns extending clockwise inwardly from the start 153. A lower track 154 has its turns arranged outwardly from the central region of the winding to the end 155 of the winding. The tracks are on respective sides of a circuit board, with the centres of the upper track turns and the lower track turns being connected through the board by interconnection 156. The upper and lower track turns together define the sense winding.

Figure 27:
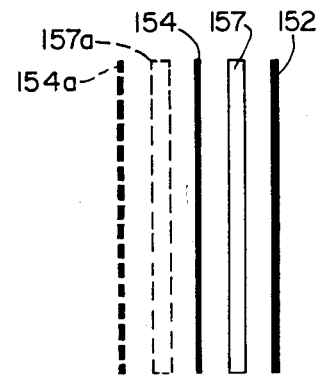
FIG. 27 is an end view of a circuit board for achieving the winding arrangement of FIG. 26.

FIG. 27 shows in end view, a board 157 with the tracks 152 and 154, and in dotted outline, a further optional board 157a and track 154a. The sense winding may also take up a generally rectangular configuration, with rounded ends, in an alternative arrangement.

In general it is advantageous to use more than one turn per coil of the sense winding, in order to increase sensitivity. Thus multiple turns may be used for each coil in any of the configurations already shown. In the arrangement shown in FIG. 26, the two coil portions, one each side of the PCB, combine to provide the effect of a single coil having twice the number of turns of each half. Each coil or loop is shaped so that the area swept out by a screen passing in proximity to it first increases and then decreases sinusoidally.

Figure 28:
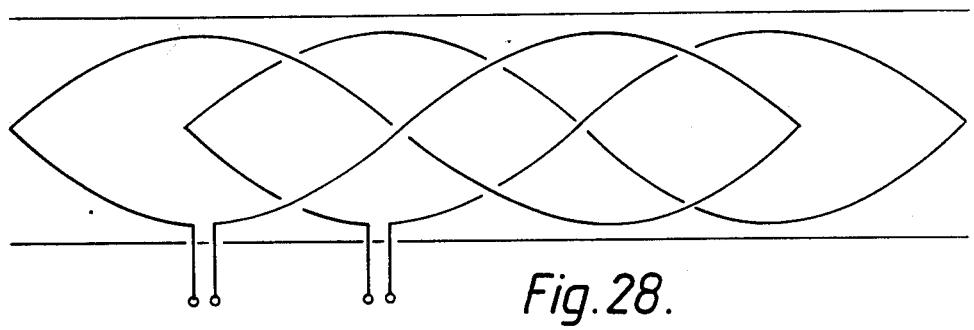
FIG. 28 shows an arrangement having two sinusoidal output sense windings in phase quadrature.
Figure 29:
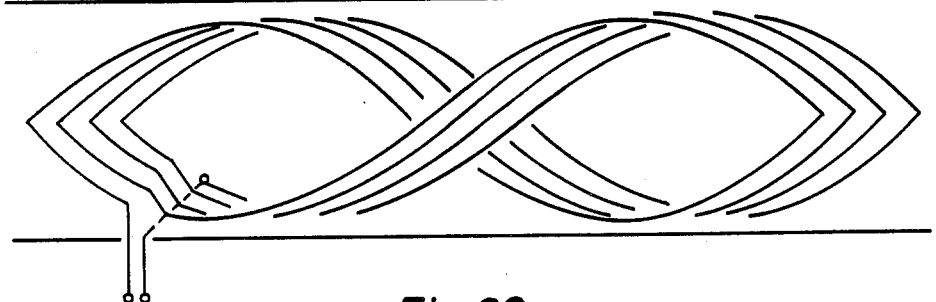
FIG. 29 shows a distributed arrangement of sinusoidal output sense winding.

FIG. 28 shows an arrangement in which each quadrature winding of a pair of single turn secondary or sense windings has such a sinusoidal shape. FIG. 29 shows a multi-turn winding for one phase in which a multiwrap thin flexible printed circuit is used, having a non-integral pitch so as to give a harmonic-reducing distributed winding. The distributed winding may be short-pitched or full-pitched.

Short-pitching averages out the waveforms so as to remove harmonics. As will be apparent in the drawing, successive turns are connected in series to provide this average output. The reduction of harmonic content in the complete winding may be achieved by short or long pitching in the individual coils. In a twenty turn winding, the pitch Per turn may be such that the total twenty turns extend over for example 9½ to 10½ wavelengths of the screens.

Alternatively two or more single or double-sided printed circuit boards may be used, each board carrying either sine or cosine windings or both. Such constructions may be easily implemented with multilayer PCB techniques. Extra windings increase the output signal voltage levels and are favoured within the constraints imposed by manufacturing cost. A sandwich construction may be provided in which double-sided printed circuit boards are separated by intermediate thin insulation layers. Each side of each board carries winding patterns generally similar to those shown in earlier FIGS.. These may be grouped in pairs, mutually displaced by 90°, to give sine and cosine signals. Four or more layers may be used to achieve higher sensitivities. An alternative method of manufacturing such multilayer assemblies is to use the track deposition technique employed in the manufacture of hybrid circuits on ceramic or other substrates.

In the practical application of the device according to the invention, the number of screens used is also of significance. Embodiments of multi-screen constructions are subsequently described in relation to inter alia linear transducers.

The magnetic circuit may be without ferromagnetic parts. Such parts, if used, must be disposed so that the drive winding always "sees" a constant permeance. Thus, the high-frequency flux-pattern remains constant in magnitude, varying only in position as the screens move, and it is possible to have an arbitrary number of displaced sense windings or phases which do not mutually interfere.

Figure 30:
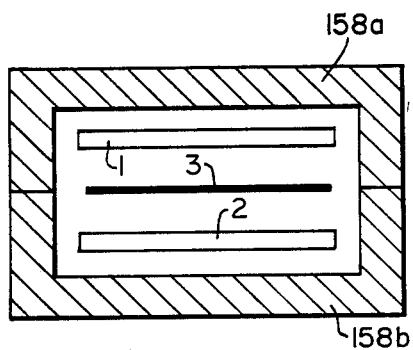
FIG. 30 shows an arrangement for including ferromagnetic elements in the magnetic circuit.
Figure 31:
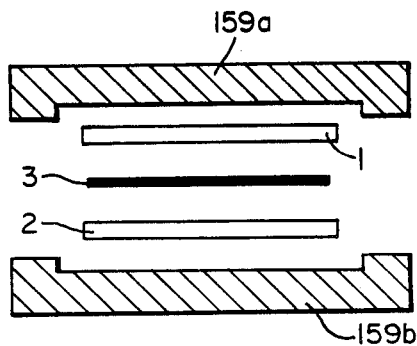
FIG. 31 shows an alternative arrangement for the inclusion of ferro-magnetic elements.

The devices illustrated and discussed so far have been air-cored devices. In any of these constructions, the field levels may be increased by introducing ferro-magnetic (usually ferrite) parts into the flux paths. Two such arrangements are illustrated in FIGS. 30 and 31 and also form features of embodiments subsequently described. Such additions have the beneficial effects of both screening the device from the influence of metal parts brought close to it, i.e. external influences, as well as increasing the field levels established by the drive winding. In each FIG., the drive winding 1, the sense winding 2 and the screen 3 are surrounded or sheathed by ferrite parts or cores 158a, 158b (FIG. 30) and 159a, 159b (FIG. 31). In the arrangement of FIG. 30, the ferro-magnetic parts meet, but in certain constructions such a configuration will not be feasible and the cores are spaced apart, as in FIG. 31.

Figure 32:
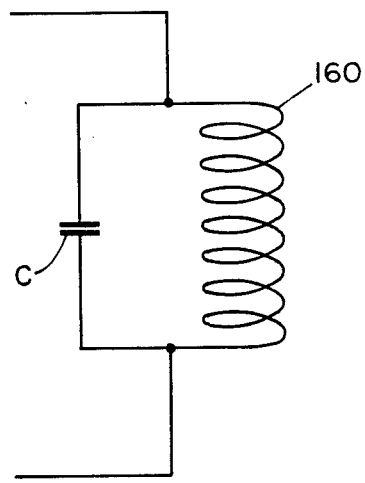
FIG. 32 shows a tank circuit for the primary or drive winding of a sensor according to the invention.

A further practical feature required in many constructions of sensor according to the invention is illustrated in FIG. 32. The mutual coupling factor between voltages applied to the drive winding 160 and those picked up on the sense windings 161a, b is proportional to their relative turns ratio. Constraints on the physical construction of the transducer typically limit sense winding turns to less than twenty per coil. To maintain a reasonable level of output voltage, drive winding turns must also therefore be limited to a relatively low number. This results in the drive winding having a low impedance with the consequence that it will draw a heavy current from the excitation circuit. The provision of a local resonant capacitor C tuned to an appropriate frequency, as depicted in FIG. 32, eliminates the need to drive these currents over long interconnection wires.

A multiplicity of specific embodiments of devices according to the invention will now be described, including constructions for monitoring linear movement, cylindrical rotating constructions, disk-form rotating constructions, adaptations of disk embodiments in which an arcuate movement is used for level measurement, tubular or solenoidal constructions for level measurement, and finally, sensors for detecting movement in two or three dimensions.

Figure 33:
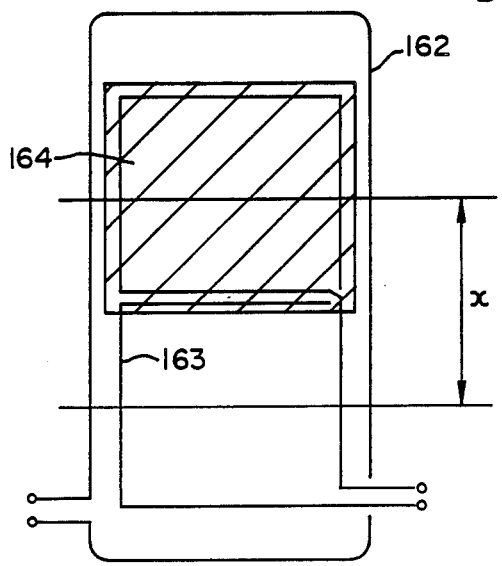
FIG. 33 shows a sensor according to the invention for indicating linear displacement.

A basic linear sensor incorporating the principles of the invention is shown in FIG. 33. This substantially equates to the basic construction shown in FIG. 9 with drive winding 162, phase/antiphase sense winding 163, and screen 164. The span of movement for which the device can provide a unique output is limited to the distance indicated by X, i.e. one half of the winding span or pitch. This may be extended by providing a second screen 164a, indicated in ghost outline, as already described in connection with the elimination of end effects and for the infinite geometry, but this adds to the physical length of the device.

Figure 34:
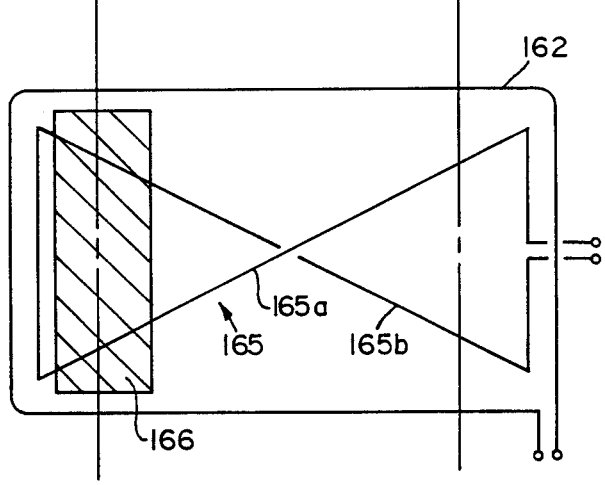
FIG. 34 shows a long travel version of a linear sensor according to the invention.

An alternative arrangement for giving continuous output over a greater extent of the winding span is shown in FIG. 34. Thus uses the effect already described in regard to FIG. 12 of altering the shape of the sense winding, so that the sense output is shaped and a unique signal is provided for every position of the screen over the span Y. Thus by altering the shape of the winding 165 so that each coil 165a, 165b of the winding is substantially triangular and reducing the dimension of the screen in its direction of displacement, compared with the FIG. 33 arrangement, a greater travel is possible with a continuous output from the sense winding, but this is achieved at the price of a reduction in sensitivity. However such reduction may be acceptable where physical compactness of the device is a more important criterion than sensitivity. Thus this relative shaping allows best use of the physical configuration and economises on use of space. The triangular shape of the coils compensates for the short screen, as the linkage is varied in first instance by the varying width of the coil and modified by screen overlap. In the rectangular arrangement, sense winding output is determined exclusively by the overlap of the constant width coil by the screen.

In general the number of screens used will have a considerable influence on the accuracy achieved. However for many purposes and in particular in rotating machines, a single screen may be sufficient, while arrangements having two, three or four poles or screens may also be favoured. The device shown in FIG. 15 considered as a linear embodiment may also represent a planar development of a cylindrical device, to provide which the developed windings are as it were "wrapped" about an actual or notional cylindrical surface to define the cylindrical windings of this embodiment of the sensor of the invention.

With suitable backing circuitry, a resolution of approximately 0.1% of the pitch may be achieved. The shorter the pitch therefore, the greater the potential accuracy of the device. With the provision of a multiplicity of screens, for example 50 or more, a very high level of accuracy and position measurement may be achieved. The effect of multiple screens is to provide full measurement accuracy over a fraction of transducer travel. However this gain in accuracy is at the expense of absolute position information, but as subsequently described, such absolute information may be combined with high precision by specialised constructions. In particular in the linear construction, a tandem device may be provided, in which for example a sensor having a fine pitch and typically 50 screens may be associated with a second unit having one screen and a long sense winding pitch, the coarse device serving for rough positioning and the multi-screen device then being used for precision measurements within a defined range. The dimensional accuracy required for the primary winding is substantially less than that needed in the sense winding, which facilitates construction of the device, in that the tolerances applicable to the forming and positioning of the drive winding coil or coils may be relatively generous.

For example if position is to be measured over a one meter length, and a device with ten screens is used, one electrical cycle will correspond to one tenth of a meter and the full resolution of the transducer is available over this length. However it is not then possible to determine which of the ten sectors is in question at any given time. To provide this additional information a further single screen device is needed to provide absolute position information but at reduced accuracy. A single screen device and a ten screen device may be combined in a coarse/fine arrangement, but there may be difficulties in lining up the zeros of the two scales. An alternative is to exploit a vernier effect by combining, for example, a ten cycle device with a nine cycle device.

In such a scheme, two scales, each having a different wavelength, also each have an integral number of wavelengths over the full scale. One scale gives fine position information, while coarse position information is derived from the difference in readings between the two scales. The particular advantage of this scheme in a linear transducer according to the invention is that each set of drive and sense windings extend over a much shorter distance than the full scale length.

Figure 35:
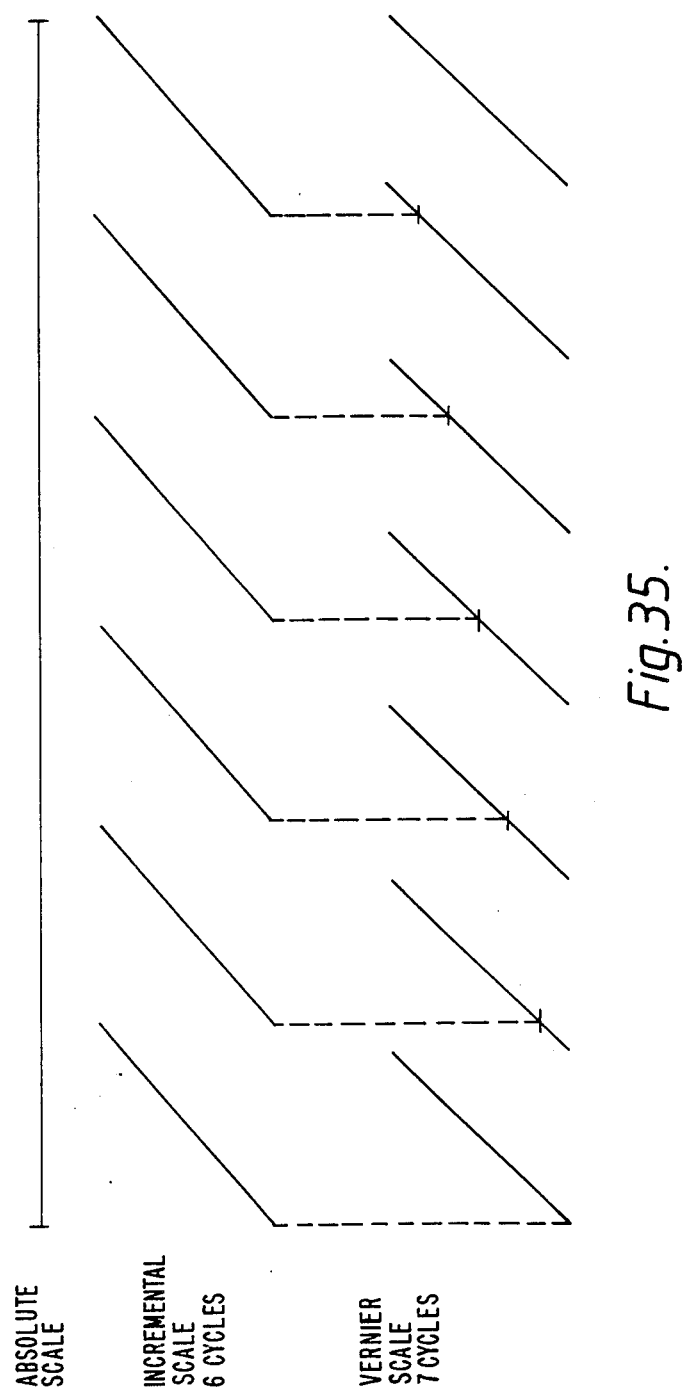
FIG. 35 shows a vernier arrangement for a sensor according to the invention.
Figure 36:
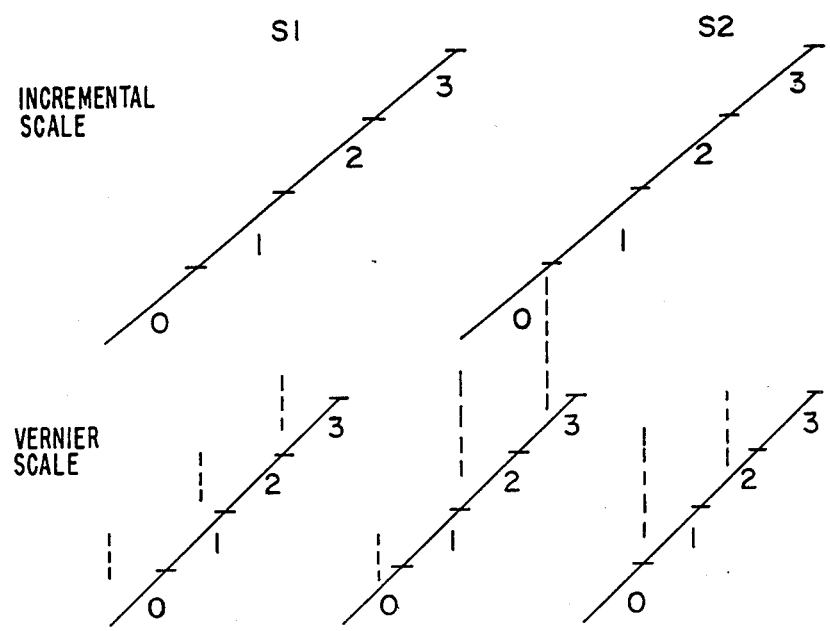
FIG. 36 shows a two cycle vernier arrangement together with a chart illustrating its functioning.

An example of a vernier scheme with six and seven wavelengths over the scale length is illustrated in FIG. 35. The incremental scale has six cycles over the full scale and the vernier scale has seven cycles over the full scale. The rate of change of information on the vernier scale is greater than that on the incremental scale and thus there is an increase in phase shift between the two sets of information, according as absolute position changes. Hence for a particular absolute position, there is a unique set of incremental and vernier readings. When digital converters are used, this information can readily be decoded using a look-up table stored in a PROM. A simpler example of a vernier arrangement is illustrated in FIG. 36, for a two/three cycle scheme using two bit converters, and the drawing includes a tabular interpretation of the scale readings.

Figure 37:
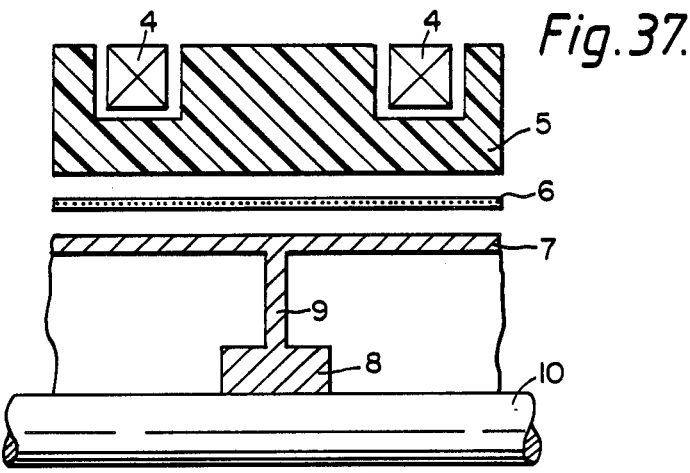
FIG. 37 is a diagrammatic sectional view of a cylindrical construction of sensor according to the invention, the section plane including the axis of rotation of the device.

A cylindrical device according to the invention representing a wrapped around arrangement of the basic linear constructions of, for example, FIGS. 15, 17 or 19, is shown in FIG. 37 in a sectional view on a plane including the axis of rotation of the unit. A pair of annular drive coils 4 are wound in external slots in a plastics former 5. The secondary winding 6 consists of a chain of coils wound in alternating senses and extending around the internal periphery of the former 5. Although represented diagrammatically in FIG. 4 as being located in the gap between the internal periphery of the former and a cylindrical space swept out by the screen 7 during rotation of the shaft 10 on which the screen is mounted, in a practical construction, the secondary or sense winding is most suitably received in a combination of axially and circumferentially extending slots in the inner surface of the former 5. Alternatively, the sense coils may be wound in a convenient shape and later formed to the correct shape, in the manner of basket-wound d.c. motors. The screen 7 is connected to a boss or hub 8 by means of a limb or leg 9 and the boss 8 is mounted on shaft 10 for rotation with the shaft. Accordingly in this embodiment, the screen moves past the coils of the secondary or sense winding in a circumferential direction along a circumferential path of constant radius and shades them in similar manner to the linear construction during this circumferential relative displacement. While this construction is described as having a single screen 7, it will be appreciated that several screens may be provided in an alternative construction. In each case the number of alternating coils of the sense winding is appropriately matched to the number of screens. It will also be appreciated that while it is constructionally simplest to maintain the windings stationary and affix the screens to a rotating member such as a shaft, an inverse device may also be constructed, in which the relative displacement between the screen and the sense winding coils is achieved by displacement of the windings relative to a stationary screen rather than by displacement of the screen relative to static windings.

Figure 38:
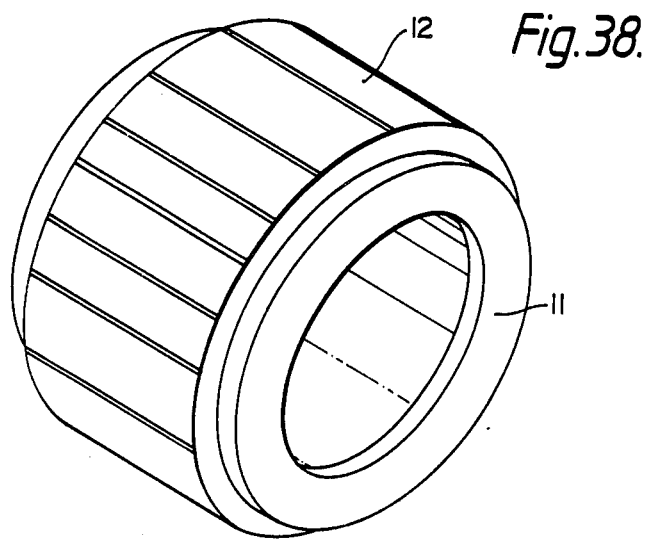
FIG. 38 is a pictorial view of a rotary device according to the invention.

FIG. 38 shows in pictorial form the stationary winding-accommodating portion of another cylindrical construction of the device according to the invention in which an external rotor having four screens is mounted in a cup-form structure over the cylindrical winding-accommodating portion of the device, this incorporating annular drive coils 11 at each axial end and having the axially extending sections of the secondary windings 12 accommodated in slots extending axially along the periphery of a cylindrical former. This embodiment of the sensor of the invention has four screens within the cup-shaped external rotor and accordingly each sense winding has eight coils or turns, every second turn being opposed in winding direction or sense, so that each coil is opposite in sense to its circumferential neighbours around the periphery of the former.

Figure 39:
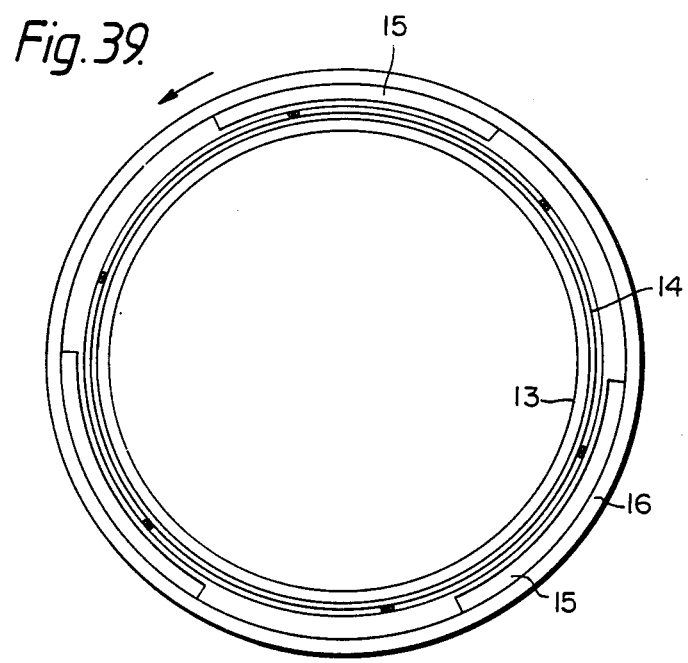
FIGS. 39 to 41 show three arrangements of cylindrical devices according to the invention in axial end view.
Figure 40:
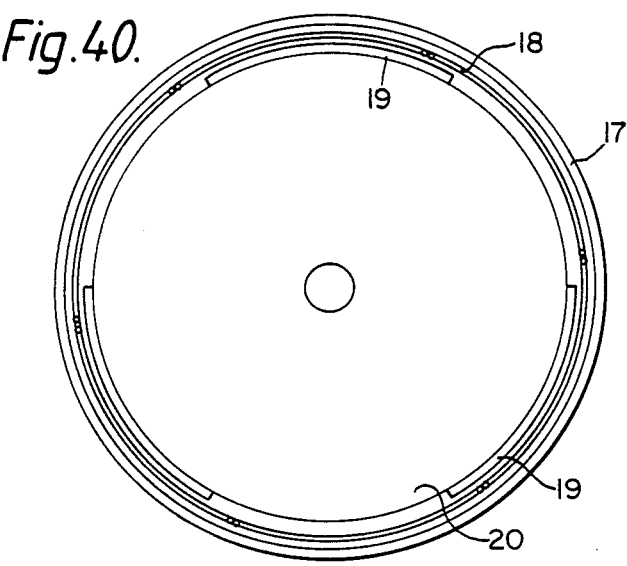

FIG. 39 is a schematic axial end view of a device similar to that of FIG. 38. The drive windings 13 may be either radially inwards of the secondary winding 14 or disposed at one axial end of the secondary winding. Alternatively two drive windings may be provided, one at each axial end of the device, as shown in FIG. 38. The screens 15, three in number in the device shown, are mounted within the rotor body. 16, which revolves radially outwardly of the stationary secondary and drive windings. The primary or drive winding 13 may alternatively be disposed at substantially the same radius as the secondary winding, rather than radially inward of it as shown, whether it consists of a cylindrical coil accommodated internally of the secondary winding or of an annular coil or coils at the axial ends of the secondary winding In FIG. 40, the construction is substantially reversed compared with that of FIG. 39. The drive winding 17 is radially outermost, with the secondary or sense winding 18 being located radially inward of it. The screens 19 are located around the periphery of a rotor body 20, which is radially inward of both sets of windings. The rotor body 20 need not necessarily be solid as implied by the schematic representation of the FIG., and the screens may be mounted on legs or limbs extending from a hub or boss, as shown in FIG. 37. In the present construction, both the sense winding and the drive winding are cylindrical.

Figure 41:
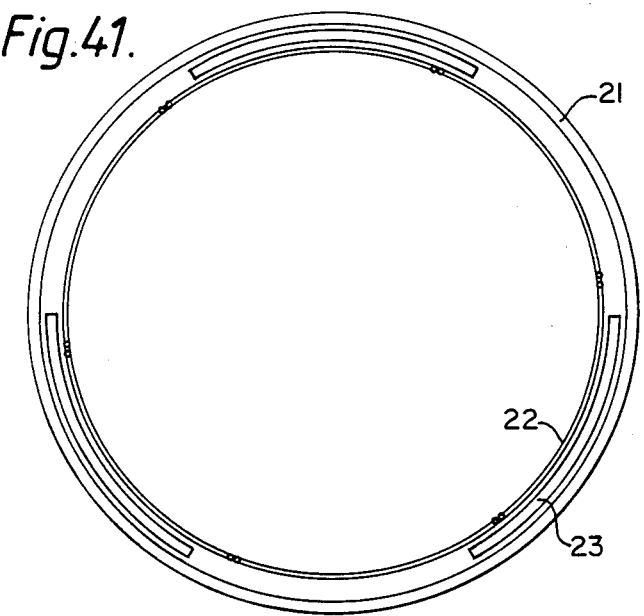

In FIG. 41, a further arrangement of cylindrical device according to the invention is shown in which the cylindrical drive winding 21 is radially outermost and the screens 23 move relative to the windings between the drive winding 21 and a radially inward cylindrical sense winding 22.

Figure 42:
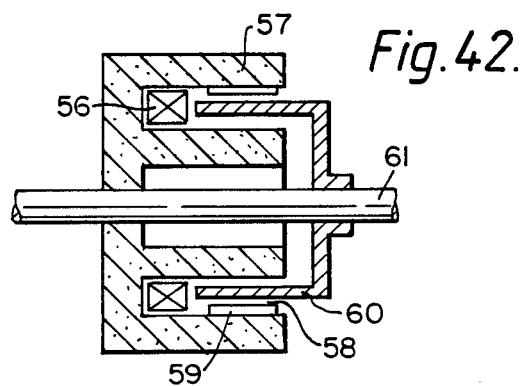

In the cylindrical construction of FIG. 42, the drive winding 56 extends in annular form about the shaft 61 and is accommodated at the base of an axially extending circumferential or annular slot or groove 58 in a ferromagnetic core 57. The cylindrical-form sense winding 59 extends around the outer periphery of this slot or groove. The screen 60 is in this construction cup-shaped, and extends into the slot or groove 58 in the core 57 from the open end of the slot.

Figure 43:
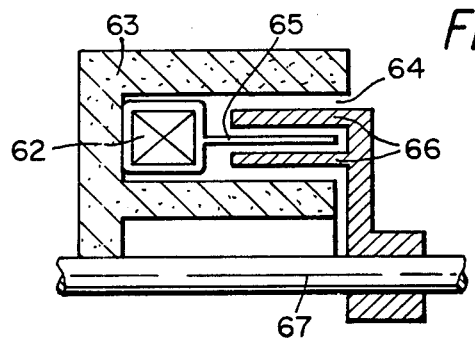

In the construction of FIG. 43, which is generally similar to that of FIG. 42, the drive winding 62 is again accommodated within a ferromagnetic core 63, at one axial end of an axially extending circumferential groove or slot 64. In this instance a flexible printed circuit defining the sense vending 65 is glued or otherwise attached to the drive winding 62, so that it extends circumferentially around the groove or slot 64, substantially radially centrally thereof and also extends axially along the length of the slot from the drive winding 62 towards the open end of the slot to define a cylindrical winding. A box-screen 66 embraces or surrounds the sense winding 65, extending into the slot 64 from its axially open end. Screen 66 is mounted on rotatable shaft 67 while the ferro-magnetic cores and the windings form a stationary part of the device.

Figure 44:
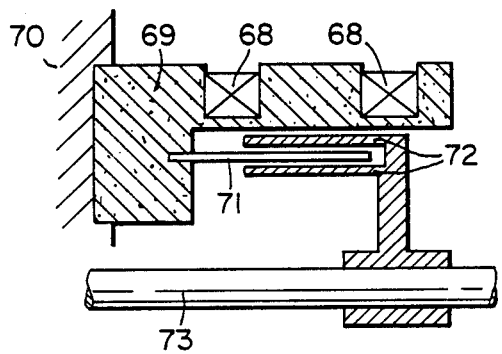

In the construction of FIG. 44, two annular drive windings 68 are accommodated in radially outwardly extending circumferential slots in an insulating former 69. Former 69 is itself secured to a static part 70 of the device or machine and extends axially from that static component 70. The sense winding 71 consists of a flexible printed circuit glued to a stiff cylinder, which also extends axially from the former 69, and is located radially inwardly of the drive windings 68. A box-screen 72 is mounted on the rotatable shaft 73. This embodiment is applicable to a construction of the device according to the invention in which the unit is not a stand-alone device but is directly associated with or built into another machine, for example an electric motor.

Figure 45:
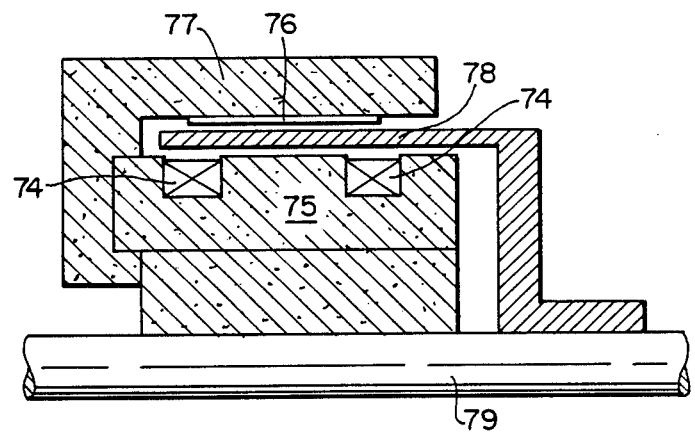

In the arrangement of FIG. 45, annular drive windings 74 are again accommodated in circumferential radially outwardly opening slots or grooves in a former 75. However, in this instance, the sense winding 76, which again may be a flexible printed circuit, is mounted on the radially inward surface of a substantially cup-shaped further former or mounting member 77, surrounding and enclosing the former 75 and its drive windings 74. In this construction the screen 78, mounted on the shaft 79, extends axially into the gap or slot defined between the inner and outer formers 75, 77 respectively, so that it is displaced between and relative to the drive and sense windings.

Figure 46:
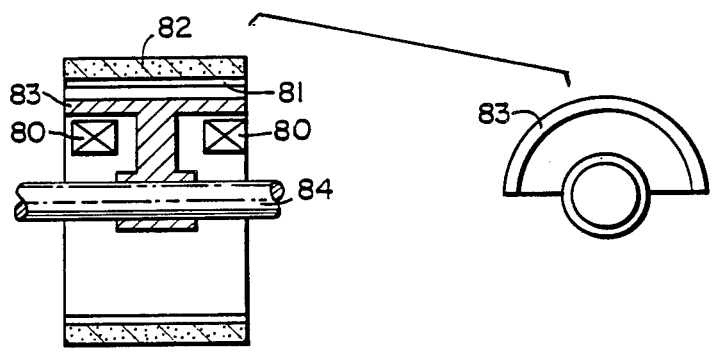

In the cylindrical construction of FIG. 46, two annular drive coils 80 are spaced apart at either axial end of the device and are located radially inwardly of the secondary or sense winding 81, which may be a flexible printed circuit laid around the inner periphery of a ferromagnetic core 82 to define a cylindrical winding. The screen 83, which consists of a half cylinder, is mounted on the shaft 84 by means of an inwardly extending limb terminating in a central boss or hub, in a manner already described.

Figure 47:
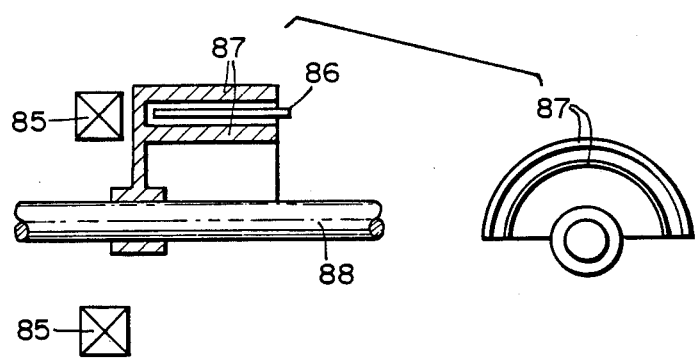

In the arrangement shown schematically in FIG. 47, the single annular drive winding 85 is located at an axial spacing from and to the opposite side of the screen 87 from the circumferentially and axially extending cylindrical sense winding 86. A box-screen 87 is depicted, mounted for rotation with shaft 88.

In the construction of FIG. 48, the drive winding 100 is accommodated in a radially outwardly open annular slot in the outer periphery of a plate form ferromagnetic core 101. In this instance the sense winding 102 has a single conductor extending circumferentially around the inner periphery of a further ferromagnetic core 103 disposed radially outwardly of core 101 and spaced radially from it so that a gap is defined between the cores. This circumferentially extending single conductor emerges after a predetermined circumferential extent of the device, in the present case 180°, and the loop or coil is closed by returning the conductor along the exterior of the core. A screen 104 also extending over 180° is mounted on shaft 105 for circumferential displacement within the gap between the ferromagnetic cores, to produce outputs of the kind already described.

Thus in this construction, the screen is again displaced relative to a succession of loops or coils along the secondary or sense winding but these loops or coils are defined by successive circumferentially following conductor segments and have relatively negligible dimensions in the axial or radial direction. Although the functioning of the device is similar to that of previous embodiments, this embodiment of the invention accordingly differs in constructional detail from the arrangements of the earlier figures in which substantially cylindrical windings having a succession of coils of substantially rectangular configuration when considered in developed form are employed, and is also distinguished from the embodiments in which coils laid out on discs or in disc-form are used, where the development of the coils again approximates to distorted rectangles. As in the case of the cylindrical or flat disc-type coil structures, the number of coils and screens may be increased by shortening the angular segment or sector over which the conductors extend from the 180° value of FIG. 48 to shorter extents.

The construction of FIG. 49 represents an adaptation of that of FIG. 47 to a motor in which the device according to the invention is fitted as part of the motor rather than as a stand-alone device. Drive winding 106 is received in an outwardly-opening annular slot of ferro-magnetic ore 107 and sense winding 109 is received in an inwardly opening annular slot in core 110. Both cores are mounted on an aluminium motor end frame portion 108. The sense winding 109 again extends circumferentially through the slot and emerges after 180°.

The screen 111 is mounted on shaft 112 and is displaced circumferentially through the slot or gap between the cores during rotation of the shaft.

Figure 50:
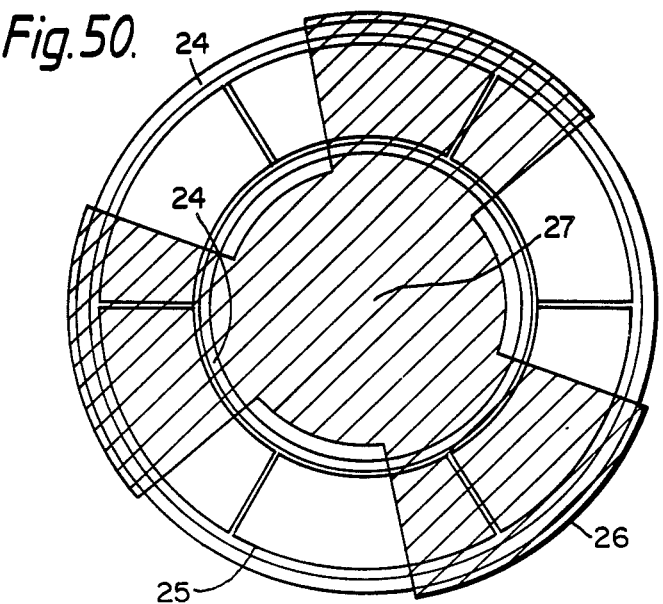
FIGS. 50 and 51 show two arrangements of a disc-form sensor according to the invention.
Figure 51:
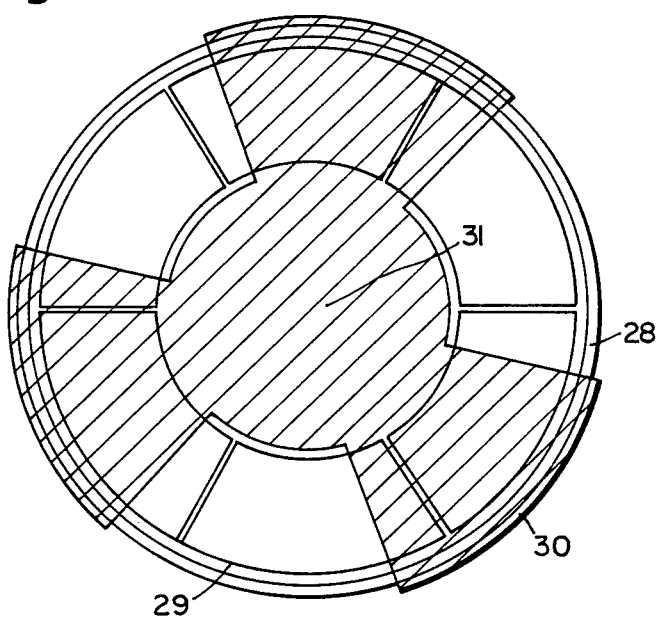

The device of the invention is also suited to embodiment in disc-form, as illustrated initially in FIGS. 50 and 51. As shown in FIG. 50, two annular drive windings 24 are provided, one of which is radially outward of the other, and the coils of the secondary winding 25 are disposed between the outer and inner drive windings 24 in a substantially radially extending plane. The screens 26 are defined by sectoral portions of a rotor 27. These sectoral portions may be defined by punching or cutting out segments from an initially disc-shaped rotor. A single drive winding may also be used, rather than the two radially spaced drive windings shown in FIG. 50. The secondary winding or coils of this disc-form construction effectively correspond again to the developed flat winding of FIG. 17, wrapped around a notional cylinder and then twisted through 90° onto a radial plane. Obviously this dual transformation requires a reshaping of the coils however, from the substantially rectangular shape of FIG. 17 to the segmental shape shown in the present FIG., with arcuate inner and outer runs and radial portions at each circumferential end of each coil or loop.

The disc sensor may occupy a very modest volume of space and may be as slim as 25 mm in the axial direction. As a stand-alone device, it may be provided with one bearing only.

In alternative constructions of sensors according to the invention, disc geometries may be used in which a predominantly axial field is broken up into sectors of strong and weak field by a flat conducting disc (or discs) with a number of cut-out sectors.

An arrangement having a single annular drive coil is shown in FIG. 51, in which the single annular drive winding 28 is disposed radially outwards of a sense winding 29, which is again located in a radially extending plane, while screens 30, again formed by sectoral peripheral portions of a plate or disc-form rotor 31, rotate relative to the windings so as to produce the desired modulated output from the secondary winding.

Figure 52:
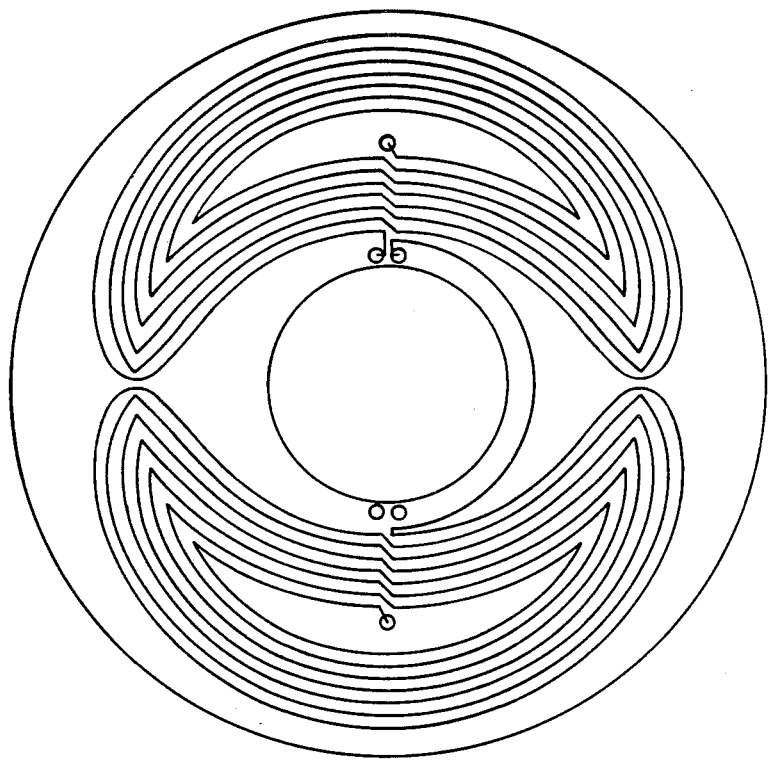
FIG. 52 is a practical construction of disk winding for a sinusoidal modulated output.

FIG. 52 shows a preferred arrangement for achieving sinusoidal modulation of the waveforms from a secondary winding in a disc-form sensor according to the invention. As shown in the present FIG., the winding arrangement consists in each case of an array of concentric turns, connected in series, and laid out or arranged in such a manner that the total flux linkage of the loop or coil defined by the turns varies as a sinusoidal function of angle according as the screens rotate. This construction of winding is especially suited to low cost production by printed circuit techniques. In the complete sensor, a similar winding displaced by 90° is provided to give the quadrature signal or output, i.e. the cosine signal. This additional winding may be provided on the reverse side of a single printed circuit board. An echelon array of discs may also be used in which successive discs are skewed about the axis of rotation to give a distributed winding effect. Four such discs as are shown in FIG. 52 may be used, to give harmonic cancellation.

Figure 53:
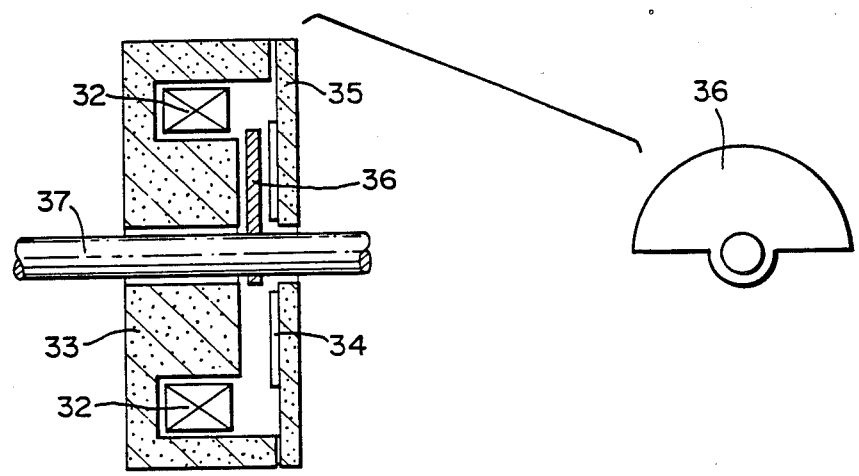
FIGS. 53 to 59 show diagrammatic views of a further variety of disc-form embodiments of sensors according to the invention.

A variety of further disc-type constructions of the device according to the invention is shown in FIGS. 53 to 59, which are now described briefly. As shown in FIG. 53, the drive winding 32 is accommodated in a ferromagnetic core 33, while sense winding 34 is also mounted on or accommodated in a further ferromagnetic core 35. A sector-form screen 36 is fixedly mounted on shaft 37 for rotation therewith relative to the annular drive winding 32 and the sense winding 34, which is in this instance located in a radially extending plane. The use of ferromagnetic cores to provide a return path has been found favourable in certain embodiments of sensors according to the invention, subject to the criteria previously set out. The provision of ferromagnetic return paths is favourable to high outputs at low frequencies and therefore facilitates miniaturisation of the device.

A more sensitive performance of the device may also be achieved. In the linear versions of the device according to the invention, ferromagnetic return elements may be arranged substantially parallel to the primary and secondary windings, for example above and/or below them in a flat arrangement in which the coils and the screen are substantially horizontal such as the constructions shown diagrammatically in FIGS. 22 to 24.

Figure 54:
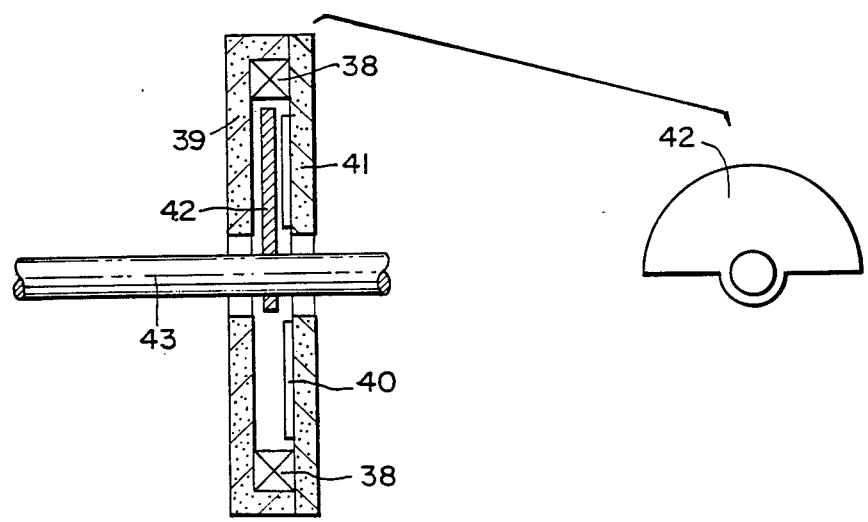

In the device of FIG. 54, the drive winding 38 is mounted with a ferromagnetic core 39 and immediately radially outward of the screen 42, as compared with its axial spacing from the plane of rotation of the screen in the device of FIG. 53. The sense winding 40 is again radially disposed and is mounted on a further ferromagnetic core 41. Screen 42 rotates with shaft 43 and is again of sectoral shape.

Figure 55:
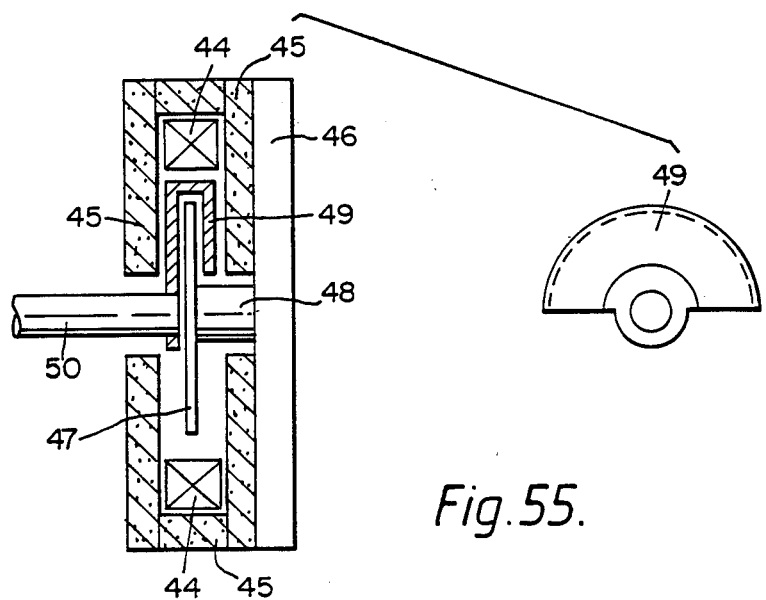

In FIG. 55, the drive winding 44 is received within an array of ferromagnetic cores 45, themselves supported by or mounted on a backing disc or plate 46. The sense winding 47, again of disc-form and disposed in the radial plane, is mounted on the free axial end of a support 48 extending axially from the backing plate 46. A so-called box-shaped screen 49 is mounted on shaft 50 and has two radially extending sectoral portions, bridged at their radially outward edges by an axially extending portion, so that the box-screen substantially embraces and surrounds the sense winding 47 during rotation of the shaft 50. Accordingly in this arrangement, the screen embraces the sense winding from its outer radial edge.

Figure 56:
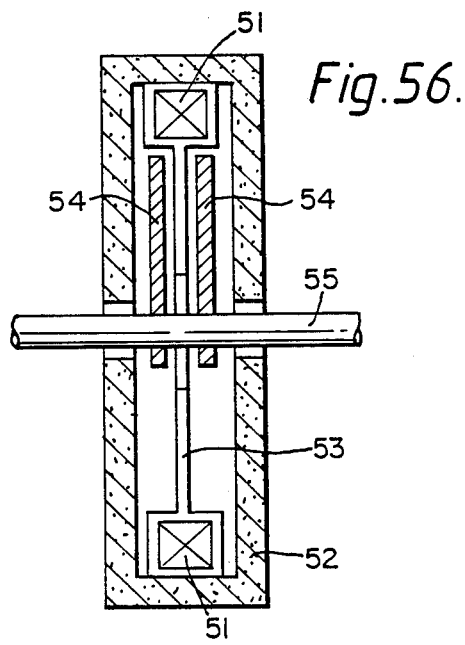

In the arrangement of FIG. 56, there is a partial inversion of the arrangement of FIG. 55. In this construction, the drive winding 51 is again accommodated within a ferro-magnetic core 52, which substantially surrounds and extends radially inwardly from the region of the drive winding towards the shaft 55. The sense winding 53 is however in this instance supported from the drive winding 51 so that it extends radially inward from it in a substantially radial plane. The complete assembly of drive and sense winding may be encapsulated.

Two sectoral screens 54 extend radially outwardly from the shaft 55, one on each axial side of the sense winding 53. The screens are again fixedly mounted on shaft 55 to rotate with it. Accordingly a box-screen construction is again provided, in this case extending radially outwardly from the shaft rather than radially inwardly towards it.

Figure 57:
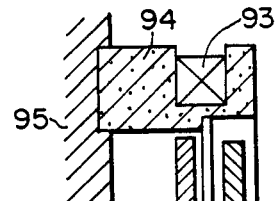

In the schematic representation of FIG. 57, the drive winding 89 is axially displaced relative to the plane occupied by a circumferentially extending sense winding 90 of disc-form. A sectoral screen 91 also extends radially in a plane between that of sense winding 90 and the axial location of the drive winding 89. Screen 91 is mounted on a rotating shaft 92.

Figure 58:
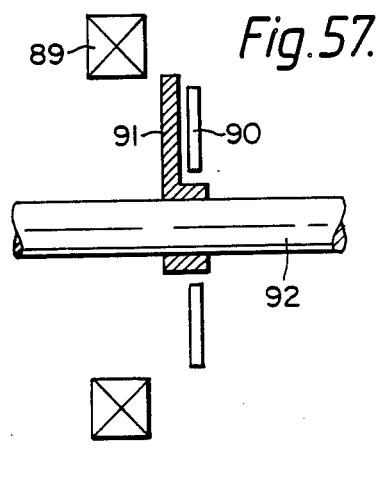

In the arrangement of FIG. 58, the drive winding 93 is disposed directly radially outwardly of the sense winding 96, which is again substantially in disc-form and occupies a radially extending plane. Drive winding 93 is accommodated in a radially outwardly open annular slot in a former 94, associated with or mounted on and extending axially from a fixed portion 95 of the device or machine with which it is associated. The sense winding 96 extends radially inwardly from and is mounted on the inner periphery of former 94, which may be of plastics. A two-part box screen 97 and 98 is provided, the inner part 97 of which is mounted directly on the shaft 99 and may be locked in Position relative to it by a grub-screw engaging the shaft through a tapped hole in the hub of portion 97. The second portion 98 of the box-screen is received on the outer periphery of the hub of screen portion 97 and may be slid along the inner screen portion and locked relative to it by means of a second grub-screw which engages the outer periphery of the hub of portion 97 through a similar tapped hole in the hub of portion 98. Accordingly the spacing of the box-screen portions relative to the secondary or sense winding may be varied in the axial direction.

Figure 59:
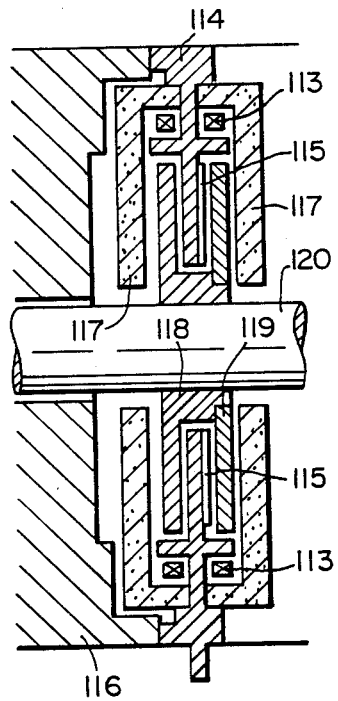

FIG. 59 shows a further and particularly favoured construction of the device according to the invention, in which drive windings 113 are mounted on either side of a substantially radially inwardly extending stator 114, in a radially outward region of the stator. Two secondary windings 115 in quadrature are attached to or mounted on the stator 114 radially inwardly of the drive coils 113, both sets of sense winding coils being preferably disposed on the save axial side of the stator. Stator 114 may be secured to or mounted on a static housing portion 116 of the device itself in a stand-alone unit or to a static portion of another electrical machine where the unit of the invention is to be incorporated in for example an electric motor. Ferrite cups 117 surround the region occupied by the windings on each axial side. A two part screen 118 and 119 defines a box-screen, embracing the radially inwardly extending stator on each axial side and itself extending radially outwards from the shaft 120 on which the screen portions are mounted. Portion 118 is mounted directly on the shaft while portion 119 is secured to portion 118, for convenience in assembly of the device. The rotor portions are most suitably provided by metallised plastics plates or discs, the metallisation preferably being on both sides.

The stator is primarily a structural support for the windings, in particular the sense winding or windings, and while it may contain ferromagnetic material in slotless annular form, this is not an essential requirement. In a particularly favoured construction, the stator is of a heat-resisting plastics material. In a further option, the stator may be of a ceramic material. A ceramic stator provides temperature stability in hostile environments.

Where the screens are inside the windings, the stator may be cylindrical, with annular external slots for the drive windings, and with a pattern of radial holes through which the sense windings are threaded. Alternatively, the stator may be a short hollow cylinder, with projecting axial pegs around which the sense windings are strung. As in the case of the sense winding located around the external periphery of a cylindrical stator, the coils may in these further arrangements again be received in a series of axial and circumferential grooves moulded in the material of the stator to define the pitch of the required chain of coils and to maintain the required dimensional relationship between successive loops of the winding. A mechanical form of assembly may be used, in which the conductors of the windings are pressed into the moulded grooves or slots. A similar slotted or grooved construction may be applied in disc-form sensors according to the invention, with the conductors being pressed into an array of slots defining for example a substantially figure-of-eight shape in a single-screen or two-pole construction.

The pitch of the secondary or sense winding must be held to a close tolerance, in order to ensure accuracy in the sensor. In an arrangement in which conductors are pressed into moulded slots in a plastics body, a very high level of accuracy may be achieved in the spacing or pitch of these conductors. In the linear or cylindrical embodiments, pitch will be seen to be the spacing in the direction of screen displacement between the sense winding portions extending transverse to that direction of displacement. An equivalent dimension applies to other forms of construction of the device.

For any of the arrangements, the sense windings may alternatively be formed on a flexible flat sheet, e.g. as a thin printed circuit, and wrapped around into a cylinder on assembly.

The sensor may be supplied as an independent unit, with its own bearings, or as rotor and stator elements for mounting on frame and shaft extensions of an existing host machine.

Figure 60:
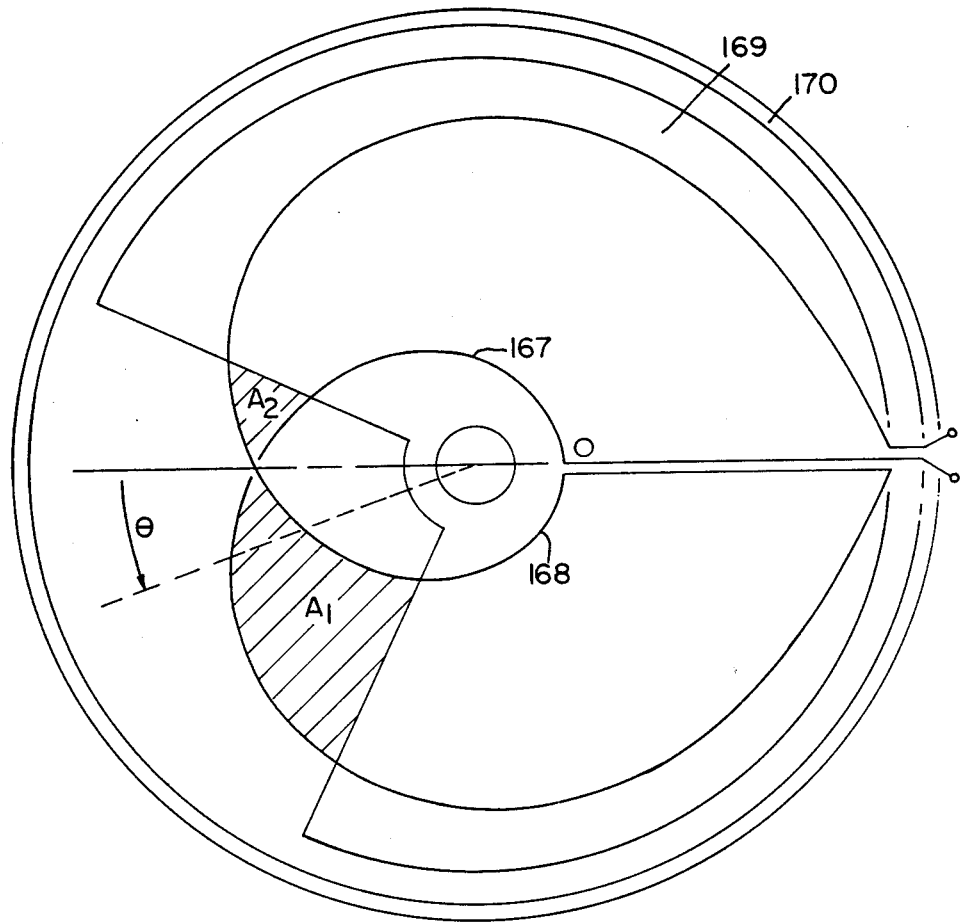
FIG. 60 shows a brushless potentiometer incorporating the principle of invention.

FIG. 60 combines the disk-type construction of the foregoing rotational embodiments of the invention with the concept of the figure-of-eight or triangular windings in the linear construction of a previous FIG., to realise proportional angle transduction over a very extended range, up to 270°. The figure-of-eight or triangle winding in the linear construction provided a linear variation of phase voltage over an angle range just short of 180°, i.e. one half of an electrical cycle. The importance of 270° is that it is the standard excursion of many linear resistive potentiometers.

Thus the arrangement of FIG. 60 provides a brushless potentiometer, in that the flat spiral search winding 167 has its radius increasing linearly with angle over 360° of positive displacement, commencing from point 0, while the search winding 168 has its radius similarly increasing for negative angles. The screen (or double screen, if dual screening is used) has an angular extent of approximately 270°, leaving an unscreened aperture for flux of approximately 90°. Flux established by drive winding 170 is linked by the series arrangement of the two search windings 167, 168 in proportion to the difference in the areas identified as $A_1$ and $A_2$ and this increases linearly with the displacement angle, indicated by $\theta$, of the screen.

The potentiometer of FIG. 60 thus represents a rotational adaptation of the flux window arrangement of FIG. 13. Similar advantages again apply, in that smaller voltages are subtracted than in the shorter screen construction, with a better zero and lower offsets. In a practical construction, the unit is housed in a suitable container or can.

The useful angular excursion may be made to exceed 270° by reducing the screen aperture to less than 90°, albeit at the expense of sensitivity. Packaging of the device may as in other embodiments include a ferrite magnetic path.

Figure 61:
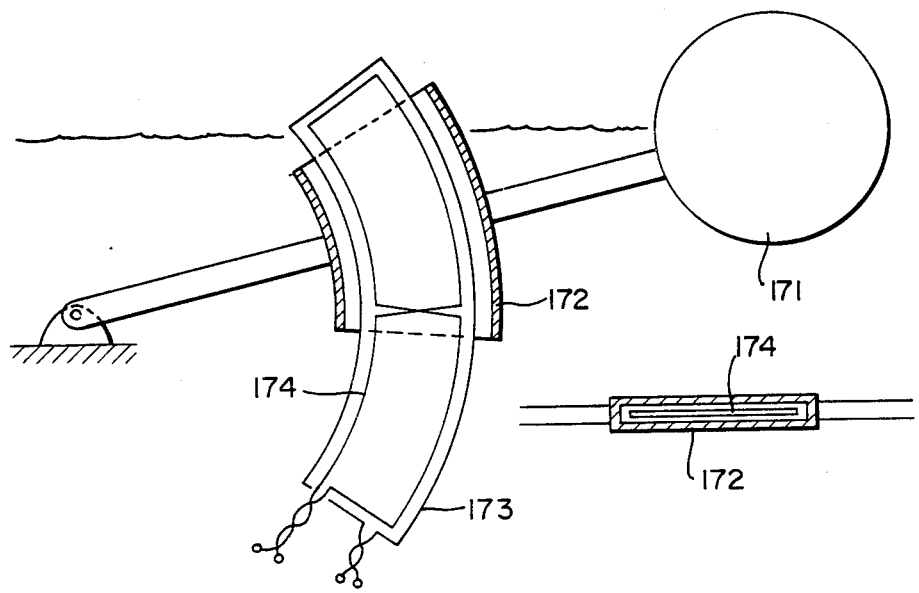
FIG. 61 shows an arcuately operating sensor according to the invention for liquid level measurement.

FIG. 61 shows a float-operated flat arcuate-shaped device. Pivotably-mounted float 171 rises and falls with liquid level to displace box-screen 172 within a field created by drive winding 173 and thereby shade sense winding 174. The size may be suited to bearing clearances and the nature of the fluid, so as to be relatively forgiving of lack of concentricity and other constructional constraints. The device illustrated resembles the linear construction of a previous embodiment, and the screen 172 is formed as a box completely surrounding the sectoral winding board. The arcuate length of the sectoral board mounting the windings 173 and 174 is substantially twice that of the displacement to be measured.

Figure 62:
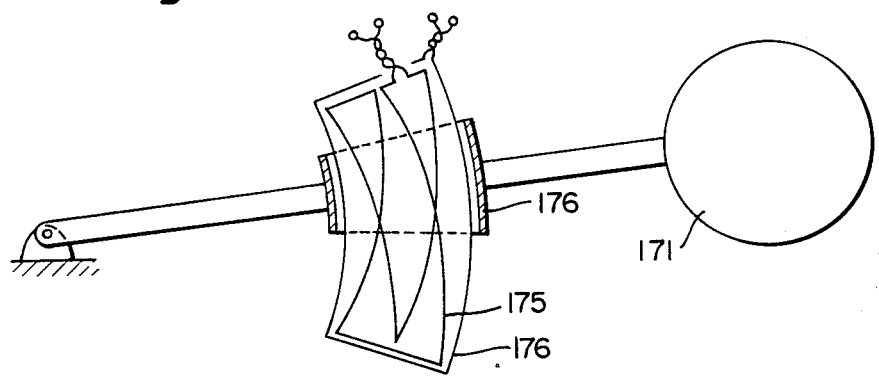
FIG. 62 shows a long travel version of the sensor of FIG. 61.

In order to reduce the unused area of the sense winding, an arrangement corresponding to the construction of FIG. 12 may be provided, as shown in FIG. 62, wherein a pair of reversed triangular coils sense coils 175, distorted into arcuate shape, are used to achieve a linear response while using a reduced arcuate length of screening box or plate 176.

Figure 63:
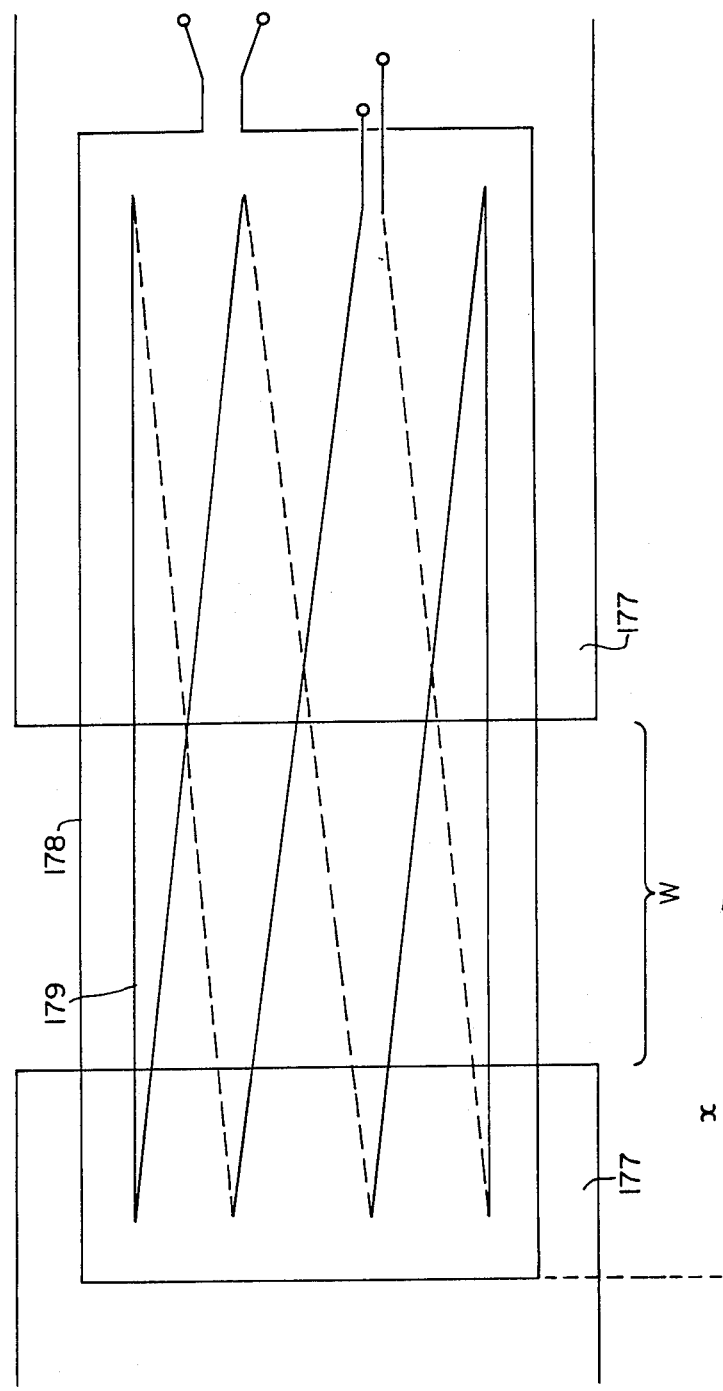
FIG. 63 shows an alternative version of linear sensor according to the invention for liquid level measurement.

FIG. 63 shows a long-stroke transducer having a short unscreened zone or flux window of span W, the scheme corresponding to the conceptual arrangement of FIG. 13. This reduces susceptibility to stray fields and improves the precision, but at the expense of the screens 177 being more extended. The drive winding is indicated by reference 178 and the sense winding by 179.

Figure 64:
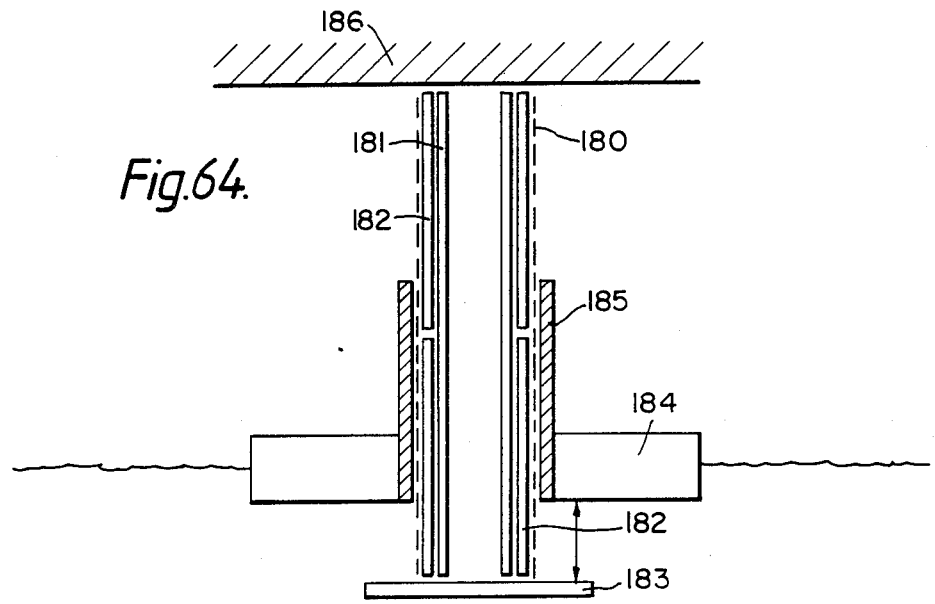
FIG. 64 shows a cylindrical embodiment of sensor according to the invention for liquid level measurement.
Figure 65:
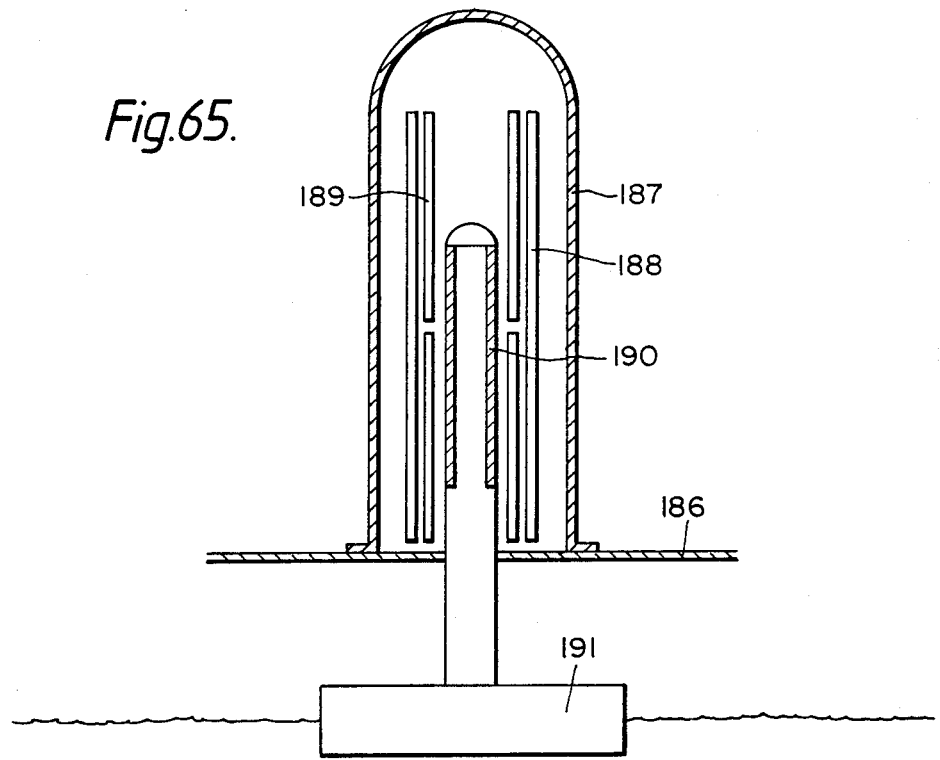
FIG. 65 shows a variation on the arrangement of FIG. 64, in which floating rod movement is used for level sensing.

FIGS. 64 to 66 show axial field geometries in which the drive and sense windings are solenoidal and the screens are cylinders or rods.

As previously explained in regard to a basic FIG., the phenomenon of the invention is not dependent on a planar construction and may be embodied in a multiplicity of configurations. In FIG. 64, stator 180 consists of a solid cylindrical encapsulation depending from the tank top 186. It carries the drive 181 and sense 182 windings, and has a bottom step 183 to prevent the float 184, which carries the hollow conducting concentric cylinder 185 representing the screen, from leaving the vicinity of the stator, should the liquid level fall unduly. Screen 185 slides upwardly and downwardly around the stator to shade the sense windings.

In the arrangement of FIG. 65, the stator 187 is a hollow encapsulation mounted on top of the tank 186 and accommodating concentric solenoidal drive 188 and sense 189 windings. The screen 90 consists of a conducting solid cylinder or hollow rod portion windings 188 and 189. As shown schematically in FIG. 66, the sense winding 189 is made up of two equal series-connected sections 189a and 189b wound in opposite directions, to provide the phase and anti-phase coils of the advantageous basic construction described in relation to a previous Figure. As in the case of equivalent linear constructions Previously described, the total transducer height is of the order of twice the height range to be measured, and the measurable range is limited to the displacement between screen positions corresponding to full shading of the phase coil and full shading of the anti-phase coil respectively.

Figure 67:
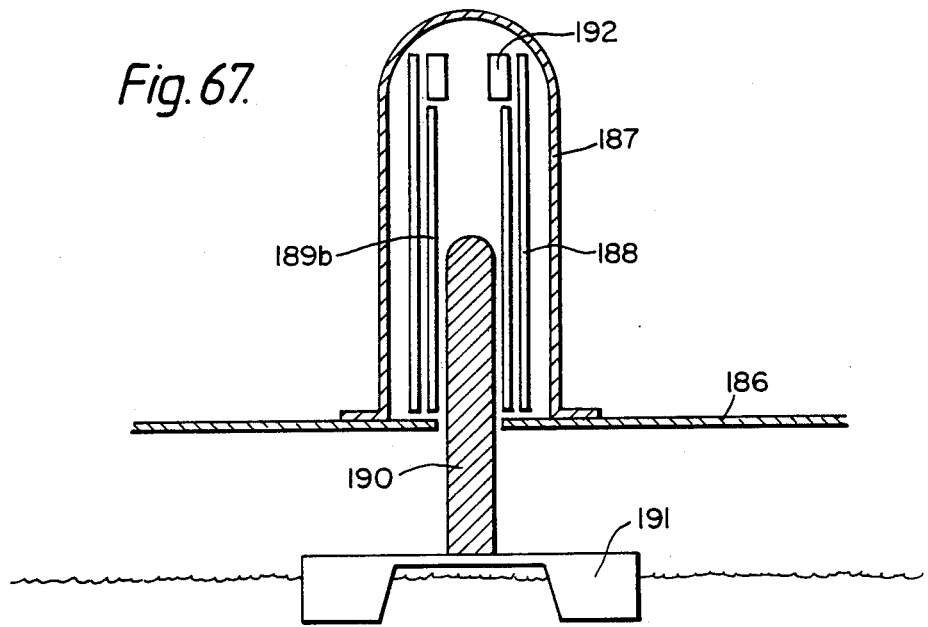
FIG. 67 shows a reduced height liquid level measuring device as a variant of that of FIGS. 64 to 66.
Figure 68:
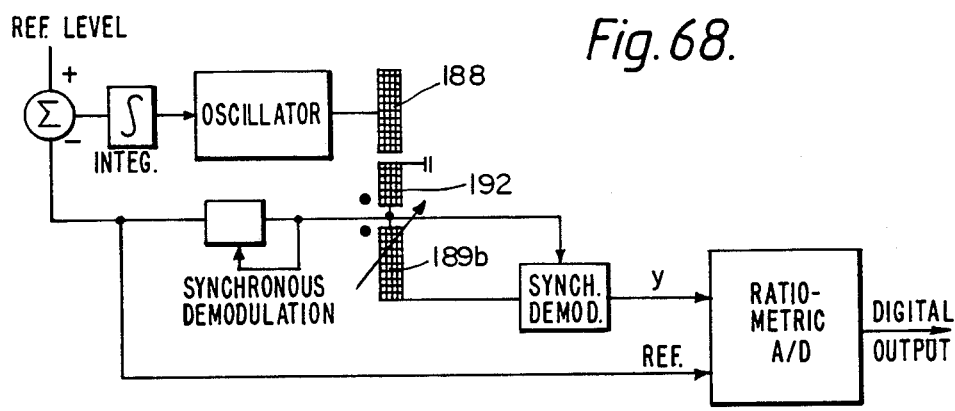
FIG. 68 shows a signal derivation system for the arrangement of FIG. 67.

FIGS. 67 and 68 show a construction and method by which a reduced transducer height may be achieved, for a given extent of level variation measurement. The upper sense winding 189a of FIG. 66 has in this instance been concentrated into a so-called current-sensing and buck winding 192. In this arrangement the drive winding self-inductance is strongly influenced by the screen, i.e. rod, position. To linearise the response, the drive circuit is controlled to maintain the demodulated voltage per turn outside the screen zone at a constant level, by the arrangement shown in FIG. 68. The buck winding voltage is used to control the oscillator level. The sense winding voltage, less the buck-winding voltage, is synchronously demodulated and digitised using a ratiometric analog to digital converter.

In the arrangement of FIG. 67, inductance varies with float movement, hence drive current and field also vary. The circuit of FIG. 68 stabilises the excitation to keep the field constant. The buck winding turns are in anti-phase to those of the sense winding 189b and are thus also subtracted from the sense signal to give zero intersection or offset.

A further advantageous adaptation of tubular or axial construction of device according to the invention is illustrated in FIGS. 69 and 70. An encapsulated stator 193 carries drive and sense windings, the latter having coils 194a and 194b wound in a phase/anti-phase configuration, as shown in FIG. 70. The screen 195 is an annular collar travelling along the exterior of the stator by displacement of float 196. Step 197 prevents float detachment. In effect this arrangement provides a tubular variant of the triangular coils of the embodiment of FIG. 12. The turns ratio of the sense winding is distributed, so that at different points of screening, the linkage differs, i.e. the axial winding pitch varies progressively along the axial length of the winding. Thus as opposed to the simple physical overlap of the basic configurations, where the extent of the screening may be directly visualised in terms of the extent of screen overlay vis a vis the sense winding, in constructions of the present nature, as in the case of the triangular winding, the effect of the screening is related to the flux which would be linked in the absence of the screen by the section of the sense winding screened.

The particular advantage of the present construction is that the screen 195 may be very short. A rod 198, (represented twice in FIG. 70, once for each coil), which may have a ferro-magnetic core, carries a uniform solenoidal drive winding (not illustrated) and a two-part sense winding 194a, 194b, each part of which extends over the full length of the rod. Parts 194a, 194b have respective tapered turn densities (turns per lineal aetre) increasing and decreasing respectively along the length of the rod and are connected in series opposition, as shown in FIG. 70. The wound rod 198 is encapsulated in the insulating sheath 193. The winding ends may be brought out through a boss 199 at the tank roof 186 or at the bottom of the tank. All of the windings are concentric and solenoidal.

A short conducting tube 195, supported by float 196, acts as the screen or slug to inhibit magnetic flux in the slugged or screened zone. With the screen removed or with the screen halfway along the rod, the sense winding 194a, b produces no net voltage output. In any other position, the screened zone incorporates sections of windings 194a and 194b having very different turn densities, so that a sense voltage proportional to the displacement of the float is produced. The screen may be as short as one tenth of the length of the rod 198.

Figure 71:
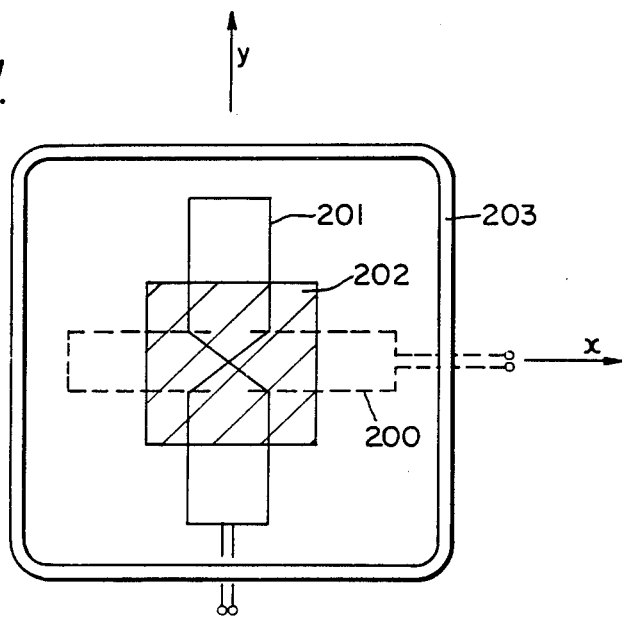
FIG. 71 shows in schematic form a device embodying the principles of the invention for detecting movement in two directions within a single plane.

FIG. 71 shows a configuration of sensor according to the invention adapted to measure the movement of a screen in two dimensions, within a single Plane. Two phase/anti-phase sense windings 200 and 201 are arranged at right angles to each other in the form of a cross, so that one of them will detect movement of the screen 202 n direction X and the other movement in direction Y. Drive winding 203 establishes the field.

Figure 72:
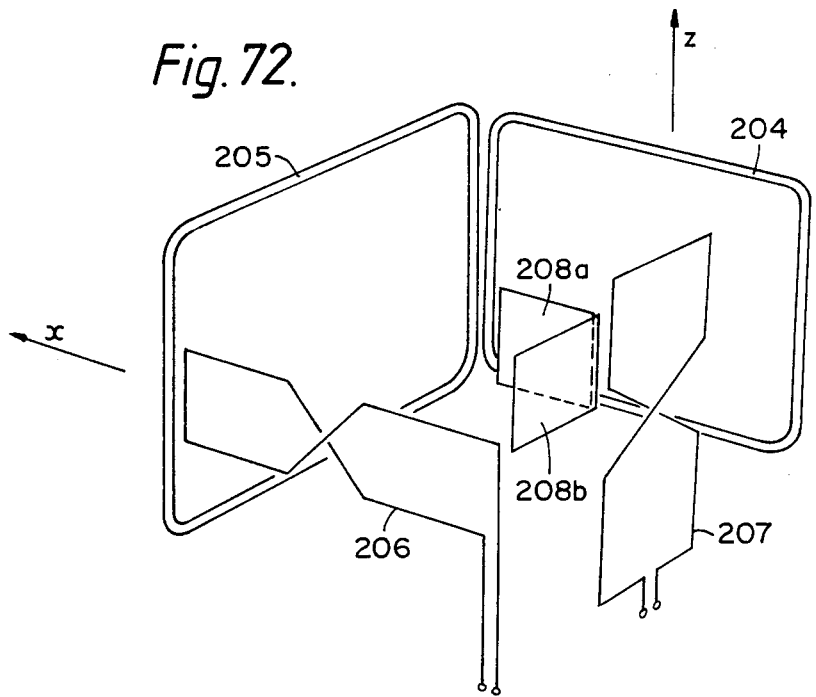
FIG. 72 shows a device according to the invention for detecting movement in two planes at right angles to each other.
Figure 73:
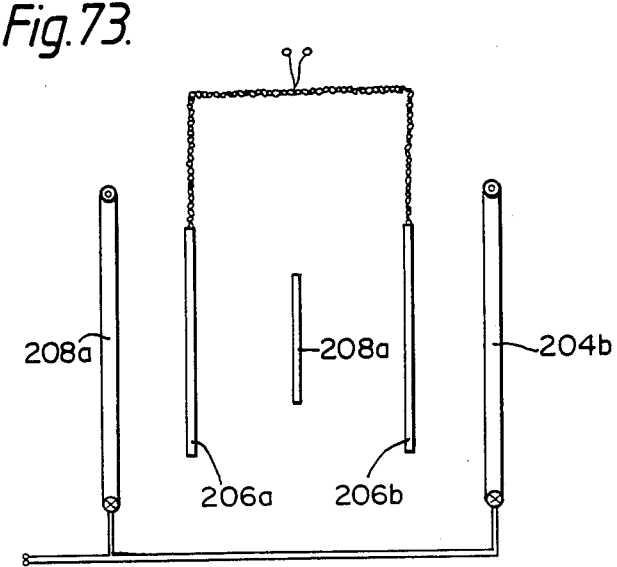
FIG. 73 shows in further detail a practical arrangement for one plane of the device of FIG. 72.

A variation of this technique allows motion in two planes at right angles to be measured, as shown in FIG. 72. In this case two drive coils 204, 205 are provided, and two sense windings 206, 207, one of which detects motion in direction X and the other of which detects motion in direction Z. The screen 208 has two portions 208a, 208b one of which is parallel to direction X and the other of which is parallel to direction Z. In practice, the arrangement shown in end view in FIG. 73 for one of the screen portions and directions would be adopted, to provide symmetry and air gap compensation, drive coils 204a, b being disposed to each side of the screen 208a and two-connected together sense winding portions 206a, b being placed one to each side of the screen.

Thus a double sense coil and double drive winding are provided.

Figure 74:
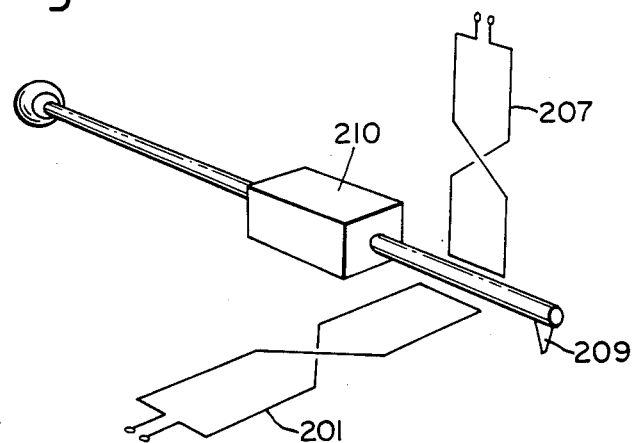
FIG. 74 is a schematic illustration of a particular application of the device of FIG. 72.

FIG. 74 shows an example of use of this effect for detecting vertical and horizontal motion of the stylus 209 of a gramophone, to give stereo-coding. In this example a box-type screen 210 is used. The arrangement is however schematic only, and drive windings are omitted.

Sine and cosine excitation of the respective drive coils is favoured in that by appropriate locking of the demodulator, the quadrature signal may be eliminated. A rotating field may thus be created within the device. Alternatively excitation fields of different frequencies may be used to eliminate interference between the two phases.

Figure 75:
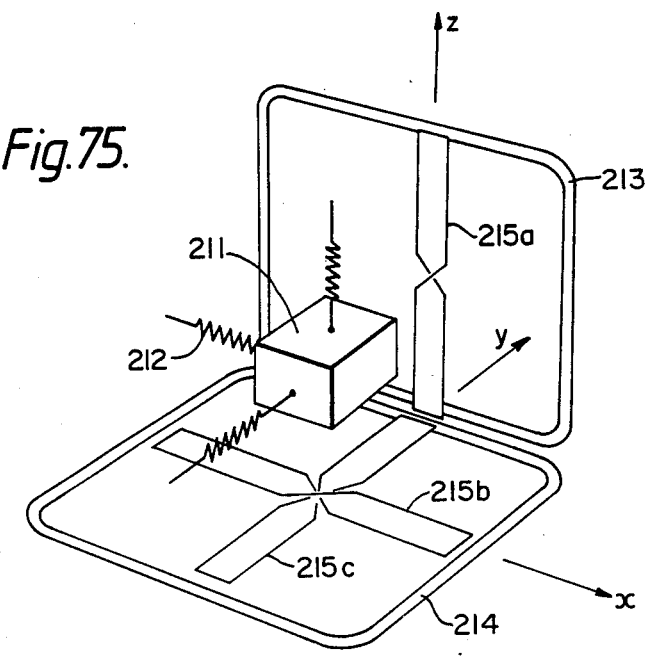
FIG. 75 shows in schematic form a sensor for detecting movement in three dimensions.

The two effects previously described may be combined in an arrangement such as that shown in FIG. 75, to allow measurement of three dimensional motion. FIG. 75 illustrates an exemplary three dimensional accelerometer, in which the screens are defined by faces of a cube 211 of known mass suspended by springs 212 of known compression constant or spring characteristic. The vertical drive winding 213 is excited by a cosine signal and the horizontal winding 214 by a sine signal. Sense coil 215a then measures vertical movements, while coils 215b and 215c detect X and Y displacement respectively.

Figure 76:
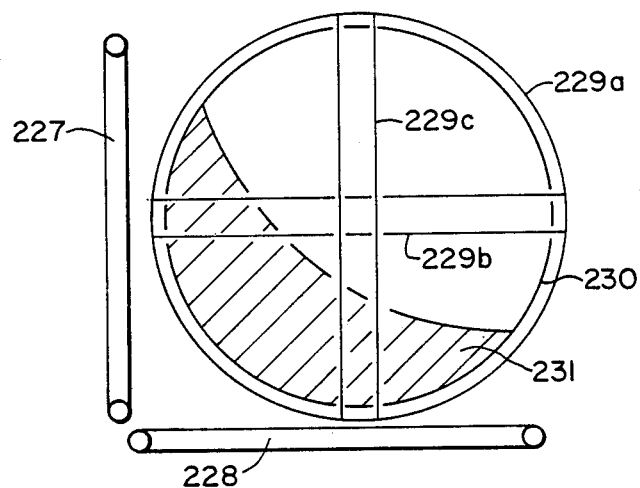
FIG. 76 shows a spherical embodiment of sensor according to the invention.

The effects may be implemented in a spherical form, as illustrated in FIG. 76, in which sine 227 and cosine 228 drive windings are again provided and the three sense coils 229a, b, c are disposed mutually orthogonally on the interior periphery of a hollow spherical region. In practice they may be located on the interior surface of a hollow spherical region. Within this spherical region, a sphere 230 coated with a hemisphere of conductive material 231 may be universally displaced to screen the three coils to varying extents and thereby provide three outputs. In a practical construction, this device may be used to provide a tracker ball or the like. Each sense coil, when developed onto a planar surface, provides a phase/anti-phase pair of coils, as in the case of previous embodiments.

Some discussion of signal processing for sensor according to the invention now follows.

In a particular construction of the sensor according to the invention, intended for use with the variable reluctance machines forming the subject of our co-pending patent application Ser. No. 789,038, now U.S. Pat. No. 4,670,696, issued June 2, 1987, entitled "Variable Speed Variable Reluctance Electrical Machines" and also with the reluctance motor control systems described in further co-pending patent application Ser. No. 788,856 entitled "Control systems for variable reluctance electrical machines", there are six screens and two secondary windings, each having an appropriate number of coils disposed in the chain array already described, and the sensor produces, after demodulation, two triangle-wave outputs A and B in phase quadrature, as shown in FIG. 21. These waveforms are fundamentally linear over the greater part of each cycle, but may have somewhat rounded peaks, depending on the characteristics of the windings and screens. As previously mentioned, the sense winding shapes may be modified to provide alternative output waveshapes, for example in this instance, to improve the sharpness of the peaks of the triangle waves, but this is not necessarily essential, since, for use in an angular position measurement system, these signals may readily be converted into a linear form. In addition, many applications require in any case digital angular Position information. Hence, a sensor/digital converter circuit for the sensor of the invention performs two functions:

(1) full linearisation of the sensor outputs, as necessary, and (2) conversion to a digital format.

Figure 77:
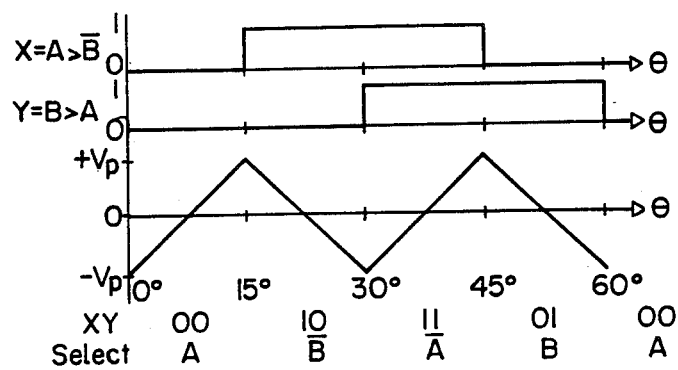
FIG. 77 to 79 are graphical representations of stages in transforming outputs such as those of FIG. 21 into digital information in a system incorporating a sensor according to the invention.

Referring again to FIG. 21, the dotted lines A and B show two additional signals derivable by inverting the original two waveforms A and B. It can be seen from this diagram that a linear triangle-wave is formed by the intersections of these four waveforms. This linear triangle-wave may be derived by switching from one signal to another in the correct sequence. The switching points are obtained by comparing pairs of the input signals. As now shown in FIG. 77, A is compared with B and B bar to produce two logic signals which are used to control such a switch. The output thus achieved is a bipolar triangle-wave of twice the frequency and approximately half the amplitude of the signals produced by the sensor.

This output thus consists of a bipolar triangle-wave and two gray-coded logic signals, whereas the desired digital position output is a linear ramp. To convert to digital, a successive-approximation type converter may be used, operating in a free-running manner.

Figure 78:
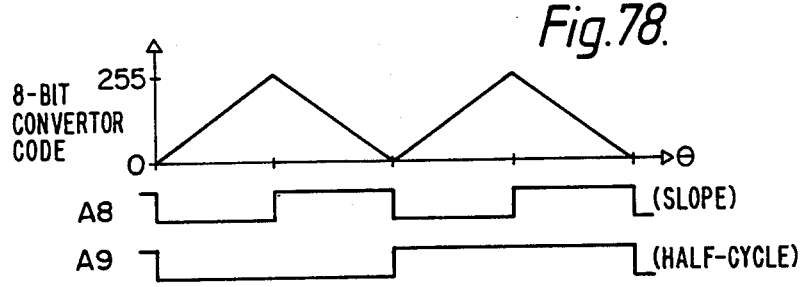

The signal to be converted is a bipolar analogue triangle wave, and hence, it must be scaled and offset before being input to the converter. The output of the converter will be the digitised representation of the triangle-wave. In the case of a 6-pole sensor, the sensor produces one cycle every 60 mechanical degrees. Thus, the converter produces a digital triangle-wave whose period corresponds to 30 mechanical degrees. Two comparator bits, after conversion to binary (A8 and A9), are used to decode the four quadrants, as shown in FIG. 78, effectively giving 10-bit resolution.

Figure 79:
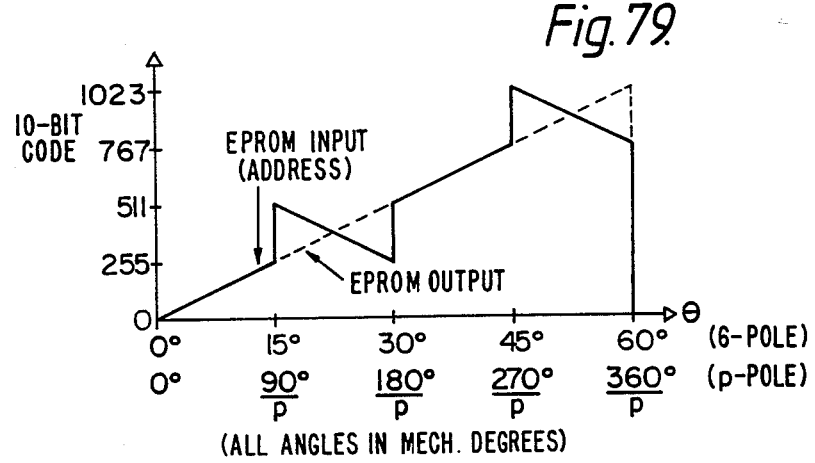

The 8 bits from the converter plus the two comparator bits may be fed into an EPROM, which contains a unique output code for every input code. The two bits, A8 and A9, from the comparators are used as the two most-significant bits to address the EPROM. FIG. 79 shows a graph of this 10-bit address over the sensor cycle. The EPROM acts as a look-up table which converts this irregular code sequence into a standard binary output, as indicated by the dotted line in FIG. 79, i.e. a ramp.

The EPROM can also be used to produce an output format compatible with other sensors. For example, in a reluctance motor control system such as that forming the subject of the co-pending Patent Application previously referred to, it may be desired to produce 720 pulses per revolution, i.e. an output code every 0.5°. A converter operating in accordance with the procedure described in relation to FIGS. 21 and 77 to 79 effectively attains 10-bit resolution over the sensor wavelength, i.e. 60 mechanical degrees for the 6-pole sensor, or resolution to 0.059°, corresponding to 6144 pulses per rev. Hence, to provide a 720-pulse output, it is necessary to divide down the output pulse rate by 8.533 which is non-integral. This can be approximated in the EPROM by scaling the values stored so that when the input is 1023 (i.e. 60°), the output will be 119. The output should then change once for every 8.5 input transitions. In practice, the ratio alternates between 8 and 9. The EPROM, therefore, performs the two required functions, namely, (1)the production of a linear ramp or sawtooth, and (2) the conversion to a required output format.

Figure 80:
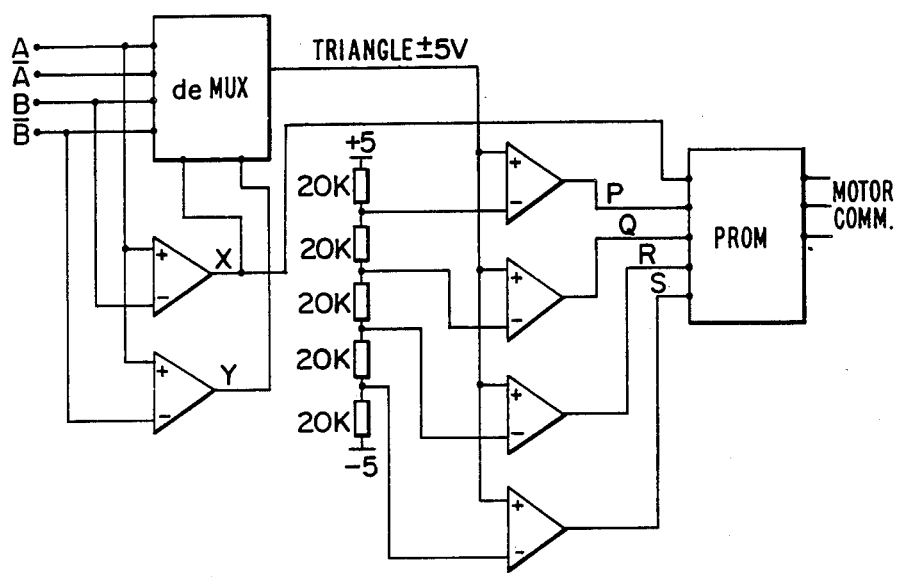
FIGS. 80, 81 and 82 show a commutation scheme for a six-pole brushless DC motor using a single screen sensor according to the invention.
Figure 81:
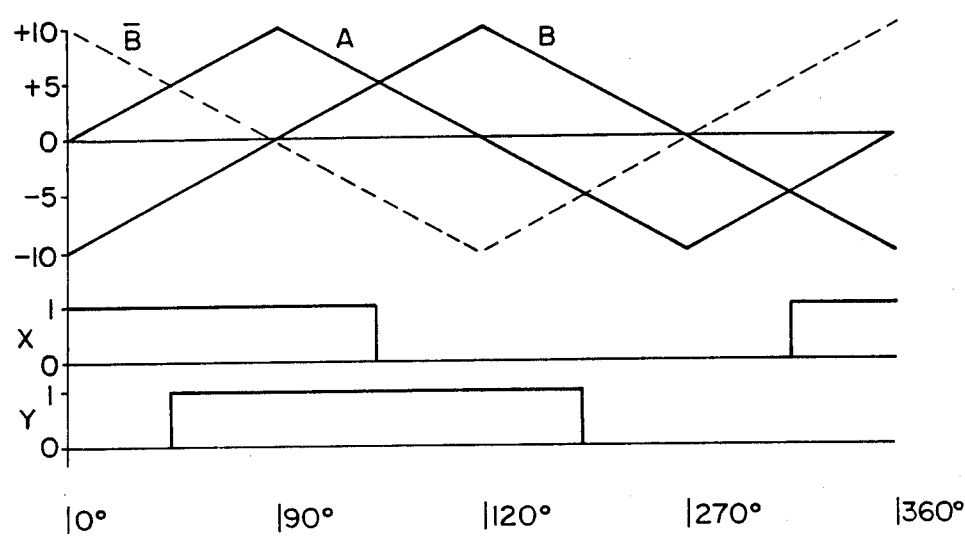
Figure 82:
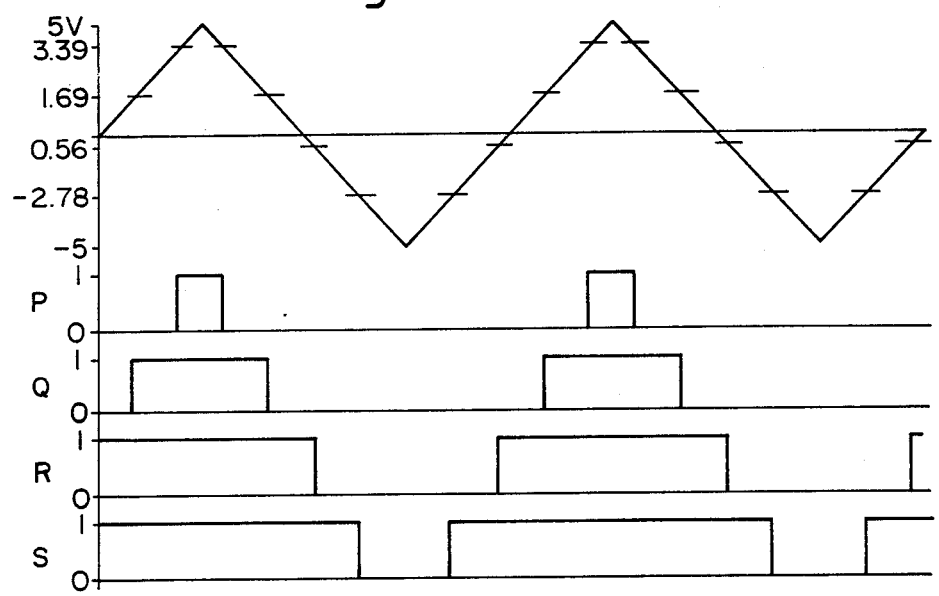

An adaptation of the sensor according to the invention for commutation in a brushless dc motor is now briefly described having regard to FIGS. 80 to 82.

A single screen sensor used with an analogue to digital converter serves to subdivide a single revolution into a large number of divisions. However, if a binary number of divisions is used, a much higher resolution than 18 is required in order to obtain the 18 equally spaced divisions required for the brushless motor switching. For example, 8 bit position resolution is required in order to obtain an accuracy to within 1° mechanical. Thus in a scheme in which binary coded position information is used, high resolution angular position information is required in order to give low resolution motor commutation information.

The arrangement illustrated in FIGS. 80 to 82 employs a total of 6 comparators to give 18 equally spaced switching points. The circuit arrangement is shown in FIG. 80 and its mode of operation consists of two stages, shown in FIGS. 81 and 82 respectively. As shown in FIG. 81, two logic signals X and Y are derived by comparing sensor triangle waves A and B with their inverses, A bar and B bar. These logic signals control the switching of the sensor triangle waves to give a bipolar triangle wave at twice the frequency of the signals produced by the sensor. The arrangement is similar to that already described in connection with the digitizing scheme.

In the second stage of the procedure, this triangle wave is compared with four preset dc levels, as shown in FIG. 82. The comparator outputs provide four-bit gray coded logic signals, which subdivide a cycle into nine equal divisions. These logic signals, P, Q, R and S, are decoded using a PROM to give the required 18 commutation points per revolution of the motor for each motor phase winding.

Figure 83:
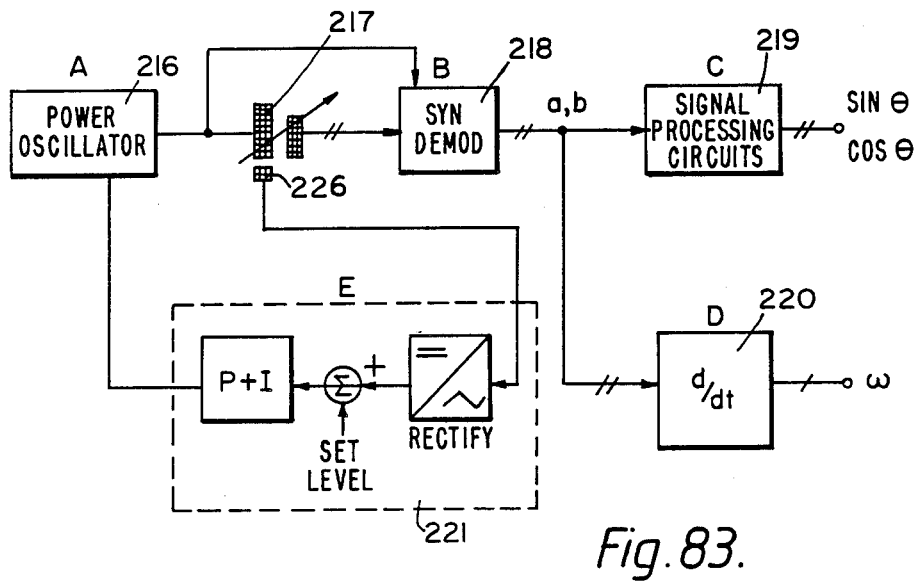
FIG. 83 is an outline block diagram of an arrangement for processing the signals from the sensor of the invention to provide position and speed information.

Turning now to the derivation of speed information as well as position data, FIG. 83 is an outline block diagram of a system for using the sensor according to the invention to provide shaft position and speed information. As shown in the drawing, the system includes a power oscillator 216, a transducer or sensor 217 in accordance with the invention, a synchronous demodulator 218, signal processing circuits 219 for manipulating the waveforms a, b into a form suitable for use in the particular control system, a differentiator/multiplexer 220, and a level controller 221. Some of these elements are now considered separately, having regard to subsequent Figure.

The power oscillator (not illustrated in detail) feeds the drive winding with alternating voltage of a frequency of the order of 10 kHz to 1 MHz. The oscillator may be regulated to stabilize the drive voltage or the output signals by the level controller 221. In order to stabilize the oscillator 216, an extra sense coil 226 may be incorporated in the transducer or sensor 217 with feedback to the controller 221. This coil is wound with the drive winding and not the secondary or sense windings which generate the output waveform This kind of feedback may be necessary in particular, where long cable lengths are in question. By resonating the drive winding with a capacitor to form a "tank circuit", the duty of the power oscillator may also be reduced.

The synchronous demodulator 218 may be realized in a variety of ways, e.g., by a set of switches synchronized with the drive voltage, by analog multipliers in which one input is the drive voltage, by gated operational amplifiers or by dedicated integrated circuits.

Figure 84A:
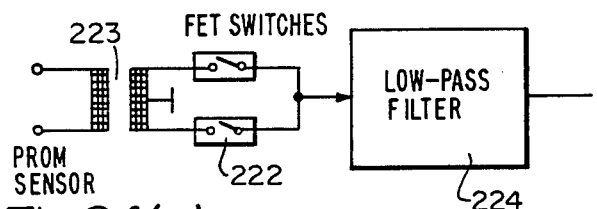
FIG. 84(a) and 84(b) shows schematically in block diagram form alternative arrangements for demodulating the sensor signals.
Figure 84B:
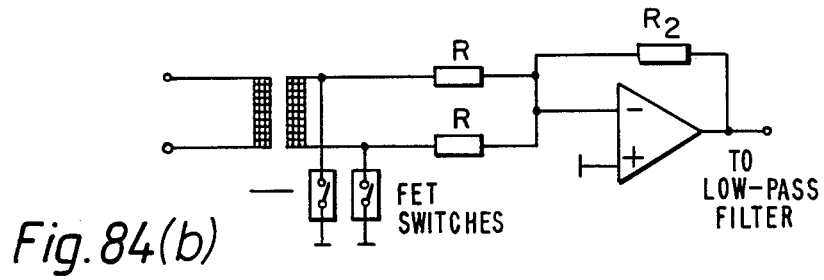

Two schemes using FET switches 222 are shown in FIG. 84. The first arrangement, identified as (a), requires a balanced feed, provided by a split secondary winding of a transformer 223 used to step up the sense winding voltages. The second arrangement, identified as (b), does not require balanced feed and uses the switches as grounding devices, so that the "injected charge", characteristic of FET switches, being passed to ground, causes lower offsets than other arrangements.

The demodulated output, after removal of high-frequency components in a low-pass filter 224, constitutes a position signal; one shaft revolution will yield one or more cycles of position information, of constant peak magnitude and having a substantially triangular or sinusoidal waveform according to the sensor geometry selected.

The signal processing circuits 219 may be, for example, (1) direct analog processing circuits in which the position ramps are shaped directly by analog circuits, or are compared directly with reference levels, (2) a successive approximation converter for multiplexing and digitising the waveforms a and b, or (3) tracking converters for converting sine/cosine a, b signals into digital form. Such converters are commercially available.

As an alternative to a sinusoidal transducer design, sine and cosine signals may be derived from the triangle signals by diode or transistor shaper networks such as are found in waveform-generator integrated circuits. Such signals may be combined to yield balanced 3-phase sinusoids appropriate for controlling 3-phase synchronous machines, by use for example, a Scott T-network. In the Scott-T network, the two triangle waves are converted to sines, and these sine waves are then added and subtracted to produce the required outputs. The device of the invention then relates in particular to general sensing in circumstances where it may replace resolvers, inductosyns and other similar devices, as well as to the particular applications also referred to herein.

Figure 85:
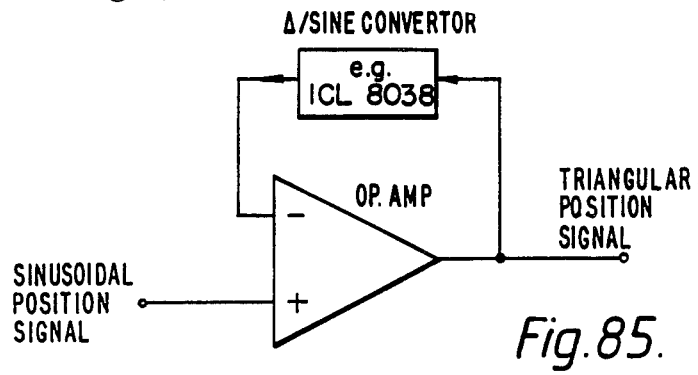
FIG. 85 shows diagrammatically a sinusoidal to triangle converter for a sensor in accordance with the invention which produces sinewave output signals directly.

For sensors producing sinusoidal signals directly, the inverse conversion can be performed, using triangle/sine converters in the feedback path of an operational amplifier as shown in FIG. 85.

This, or other conversions, may also be carried out by means of "look-up tables" stored in a digital memory. In particular, a set of digital numbers increasing linearly over one wavelength may be generated, by combining the piecewise-linear information from two or more triangular position waves, thus giving the system the character of an absolute digital encoder. Such an arrangement has already been described in principle in regard to FIG. 21.

Reverting to FIG. 83, and considering now a speed output from the sensor, rate of change of position constitutes velocity. The differentiator block 220 finds the time-rate-of-change of two or more position signals and multiplexes them to form a single velocity signal.

Figure 86:
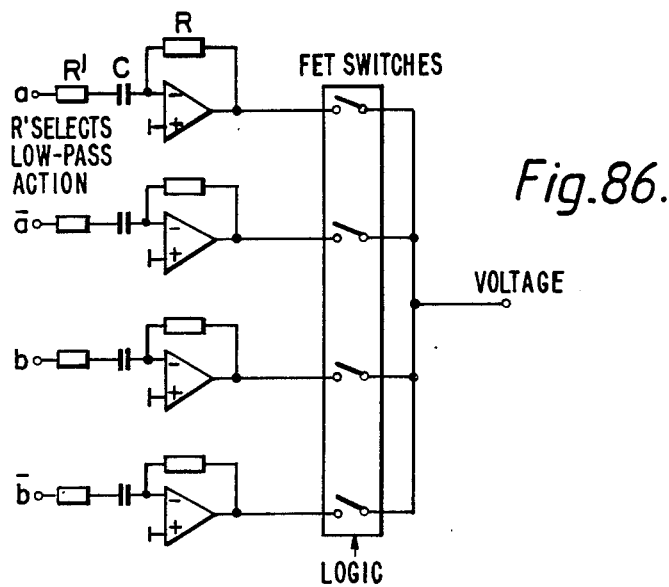
FIG. 86 shows in outline form a differentiator circuit for establishing a speed signal from the outputs of a sensor according to the invention, FIG. 87 an alternative arrangement to that of FIG. 86, in which passive differentiators are used.

A wide choice of techniques is available but in the arrangement shown in FIG. 86, operational amplifier analog differentiators operating on a pair of triangular position signals A, B, and their inverses A bar, B bar differentiate all four signals simultaneously and multiplex the outputs to provide a "speed" voltage.

In alternative arrangements, two signals A and B may be differentiated to form −dA/dt and −dB/dt by analog differentiators and the outputs multiplexed, A and B may be differentiated and the outputs multiplexed into an instrumentation amplifier, or the four signals A, B, A bar and B bar may be multiplexed into a single differentiator.

Figure 87:
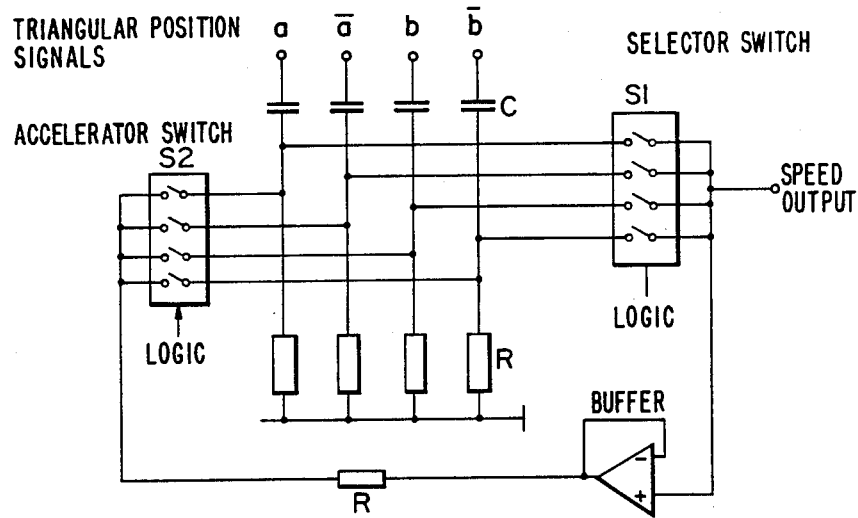

All of these schemes may suffer from offset voltage errors, and in a further scheme, illustrated in FIG. 87, passive differentiators are used. In this scheme, settling of the passive differentiators is accelerated or forced. Each "incoming" differentiator is forced to the more settled level of the "outgoing" differentiator. The effect is that the chain of differentiators coming sequentially into use "inherit" the settling done by their predecessors, and behave as one differentiator driven by a linear (rather than piecewise linear) position signal. This arrangement overcomes the possible problems of alternative arrangements in which for example, the four signals are differentiated and the outputs multiplexed or two signals are differentiated and multiplexed into an instrumentation amplifier. However the R and C values required for an acceptable tachogenerator constant (volts/RPM) make the output of these schemes fall off at high speed: the natural settling time-constant RC slows the response of a passive differentiator to the slope changes of the triangle wave. At high speeds (and high frequency of the triangle wave) the differentiators may be multiplexed to the output before they have "settled", with a consequent short-fall in output voltage resulting in non-linearity of the voltage-speed characteristic.

A hybrid scheme may be devised in which the low-speed response provided by passive differentiators is blended into a high-speed response provided by frequency/voltage conversion, or otherwise.

The schemes described so far use continuous differentiation. The change in position signal detected in fixed time is also a measure of speed, and a sampling technique is used in the arrangement shown in FIG. 88.

One terminal of a capacitor is grounded at a clock frequency so that, on release, it follows the change in a position signal applied to the other terminal. In effect, the "old" sampled value is stored on the capacitor and subtracted from the current value. The output voltage is a series of ramps at clock frequency, and the average or peak value may be used as a speed signal. Input multiplexing is used, with inhibit of commutation during a sampling period.

Figure 88:
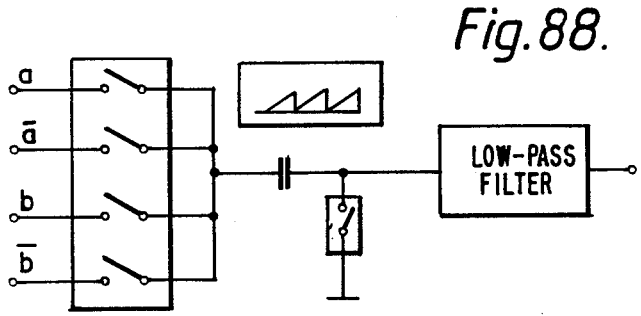
FIG. 88 shows in diagrammatic form an arrangement for establishing a measure of speed using a sampling technique.

In alternative arrangements, a conventional sample and hold circuit and a differential amplifier may be used to perform the same functions as the scheme of FIG. 88. Where the analog signals have already been converted to digital form, the speed signal is easily available as a difference.

Figure 89:
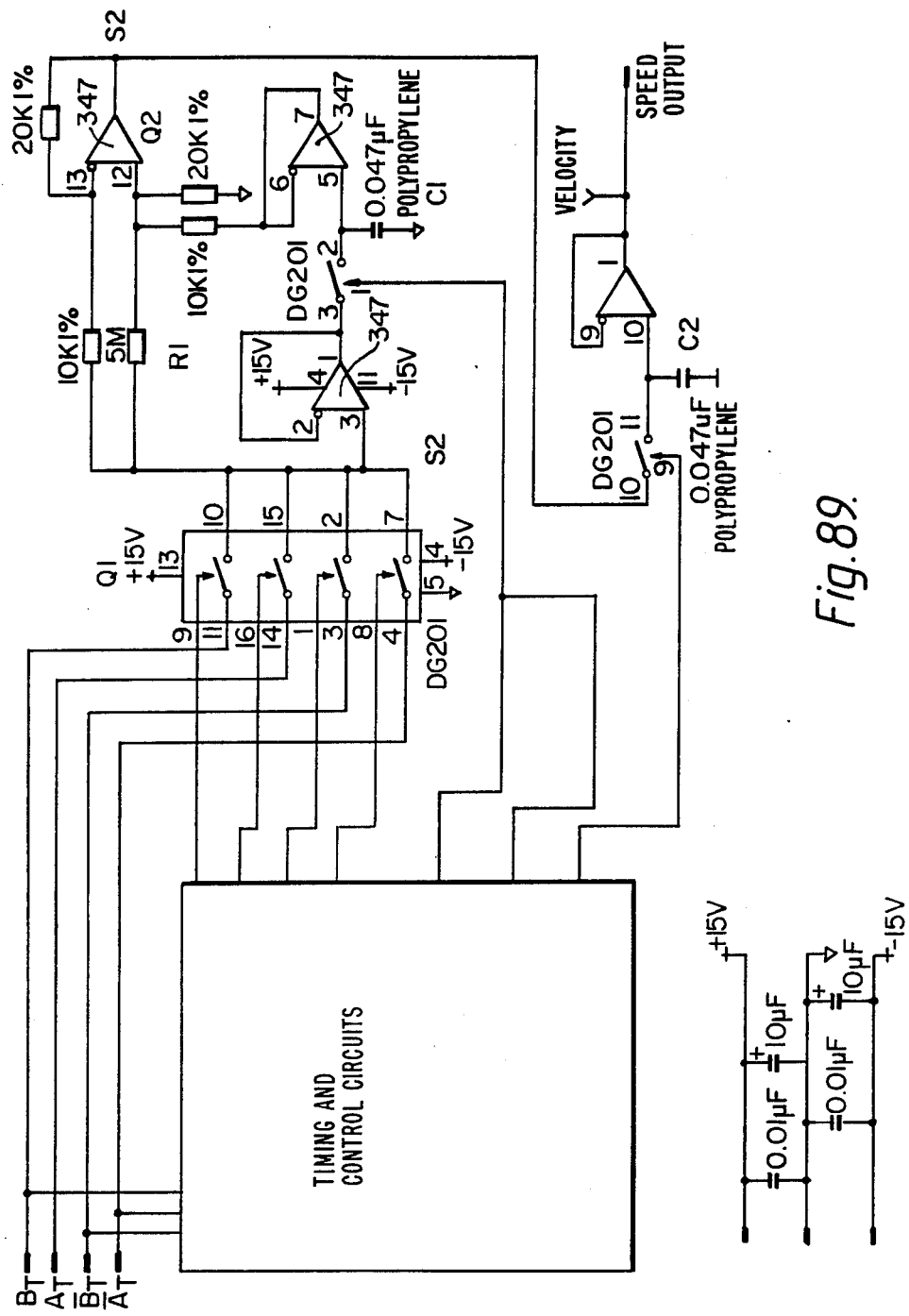
FIG. 89 is a circuit diagram of a sample/hold arrangement which can be substituted for passive differentiators in an arrangement for demodulating sensor signals.

In the active differentiator arrangement shown in FIG. 89, the incoming position dependent ramps A, B, A bar, B bar are multiplexed into a sawtooth waveform $S_1$ by means of analogue switches (components $Q_1$). This waveform is sampled repetitively and its instantaneous value is held on capacitor $C_1$. Operational amplifier $Q_2$ measures the difference between the sawtooth and this stored value. If the sensor is stationary the difference will remain zero. If the sensor is moving, the difference will increase with time at a rate determined by velocity, as the sawtooth changes in magnitude. The difference is reset to zero with each new sample held on capacitor $C_1$. The result is thus a time dependent sawtooth $S_2$, with magnitude and polarity determined by velocity. A velocity signal may be obtained from the average value of the sawtooth by filtering, or by sampling the peak value and holding it. As illustrated, this latter method is used, $C_2$ being the hold capacitor. With linear ramps and steady speed, the filtered output of the differentiator should be constant, but in order to ensure this and remove any superimposed attenuated component of the initial position-related sawtooth $S_1$, part of $S_1$ may be subtracted from the output of $Q_2$ by means of a high value resistor $R_1$.

We claim:

1. A sensor comprising a substantially solenoidal drive or exciting winding for establishing a forward or drive field, at least one secondary or sense winding in which a voltage may be induced in the presence of said forward or drive field, and at least one conductive screen within which eddy currents are generated in the presence of said forward field, said solenoidal drive or exciting winding and said at least one secondary or sense winding being substantially coaxial, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, said at least one conductive screen having an axis of symmetry and a surface region which extends substantially circumferentially with respect to said axis of symmetry, said at least one secondary or sense winding being disposed about the periphery of a notional cylinder which is substantially coaxial with said axis of symmetry of said at least one conductive screen, and the relative displacement of said at least one conductive screen and said at least one secondary or sense winding being in the direction of said axis of symmetry of said at least one conductive screen and said axis of said notional cylinder which is substantially coaxial therewith.

2. A sensor according to claim 1, wherein said at least one secondary or sense winding has first and second coils, said coils being connected so that in the presence of said forward or drive field the voltage induced in the second coil in the absence of said at least one conductive screen is substantially equal in magnitude but opposite in polarity to the voltage induced in the first coil.

3. A sensor according to claim 1, wherein said surface region of said at least one conductive screen is substantially circular cylindrical and said at least one secondary or sense winding is substantially solenoidal and has a turns density which is substantially uniform along the axial extent of said at least one secondary or sense winding.

4. A sensor according to claim 1, wherein said surface region of said at least one conductive screen is substantially circular cylindrical and said at least one secondary or sense winding is substantially solenoidal and has a turns density which varies in a substantially sinusoidal manner along the axial extent of said at least one secondary or sense winding.

5. A sensor according to claim 1, wherein said surface region of said at least one conductive screen is substantially circular cylindrical and said at least one secondary or sense winding is substantially solenoidal and has a turns density which varies in a substantially linear manner along the axial extent of said at least one secondary or sense winding.

6. A sense system comprising a sensor having a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, said at least one conductive screen having an axis of symmetry and a surface region which extends substantially circumferentially with respect to said axis of symmetry, said at least one secondary or sense winding being disposed about a periphery of a notional cylinder which is substantially coaxial with said axis of symmetry of said at least one conductive screen, and the relative displacement of said at least one conductive screen and said at least one secondary or sense winding being in the direction of the axis of symmetry of said at least one conductive screen and said axis of said notional cylinder which is substantially coaxial therewith, means for applying an alternating voltage to said drive or exciting winding, and means for processing the output signal from said at least one secondary or sense winding to provide a signal indicative of the relative disposition of said at least one conductive screen and said at least one secondary or sensing winding.

7. A sensing system according to claim 6, wherein said means for applying an alternating voltage to said drive of exciting winding is an oscillator, and the sensor comprises an excitation-sensing winding, said at least one conductive screen being displaceable relative to said excitation-sensing winding so as to vary the voltage induced in said excitation-sensing winding, and the output voltage of said excitation-sensing winding being input to said oscillator so that the excitation applied to the sensor may be varied to keep said forward or drive field substantially constant during said displacement of said at least one conductive screen relative to said at least one secondary or sense winding and said excitation-sensing winding.

8. A sensing system according to claim 6, wherein said drive or exciting winding of the sensor is a two-terminal winding, and the sensor also comprises a tuning capacitor for tuning said drive or exciting winding to a desired excitation frequency, said tuning capacitor being connected in parallel with said drive or exciting winding and located in the vicinity of said drive or exciting winding.

* * * * *